(12) United States Patent
Auslander et al.

(10) Patent No.: US 6,827,769 B2
(45) Date of Patent: Dec. 7, 2004

(54) PHOTOSENSITIVE OPTICALLY VARIABLE INK HETEROGENEOUS COMPOSITIONS FOR INK JET PRINTING

(75) Inventors: Judith D. Auslander, Westport, CT (US); Richard A Bernard, Norwalk, CT (US)

(73) Assignee: PItney Bowes Inc., Stamford, CT (US)

( * ) Notice: Subject to any disclaimer, the term of this patent is extended or adjusted under 35 U.S.C. 154(b) by 0 days.

(21) Appl. No.: 10/119,885

(22) Filed: Apr. 10, 2002

(65) Prior Publication Data

US 2003/0041774 A1 Mar. 6, 2003

Related U.S. Application Data

(60) Provisional application No. 60/290,117, filed on May 10, 2001.

(51) Int. Cl.[7] .............................................. C09D 11/00
(52) U.S. Cl. ................. 106/31.32; 106/31.43; 106/31.58; 106/31.75; 106/31.86; 106/31.64
(58) Field of Search ........................... 106/31.32, 31.43, 106/31.58, 31.75, 31.86, 31.64; 252/301.16

(56) References Cited

U.S. PATENT DOCUMENTS

| | | | |
|---|---|---|---|
| 4,015,131 A | 3/1977 | McDonough et al. | 250/461 |
| 4,705,567 A | 11/1987 | Hair et al. | 106/20 |
| 5,084,205 A | 1/1992 | Auslander | 252/301 |
| 5,114,478 A | 5/1992 | Auslander et al. | 106/20 |
| 5,135,569 A | 8/1992 | Mathias | 106/22 |
| 5,145,518 A | 9/1992 | Winnik et al. | 106/21 |
| 5,231,135 A | 7/1993 | Machell et al. | 525/123 |
| 5,294,664 A | 3/1994 | Morrison, Jr. et al. | 524/560 |
| 5,310,887 A | 5/1994 | Moore et al. | 534/729 |
| 5,331,097 A | 7/1994 | Gunnell et al. | 549/226 |
| 5,502,304 A | 3/1996 | Berson et al. | 250/271 |
| 5,514,860 A | 5/1996 | Berson | 235/468 |
| 5,525,798 A | 6/1996 | Berson et al. | 250/271 |
| 5,554,842 A | 9/1996 | Connell et al. | 235/491 |

(List continued on next page.)

FOREIGN PATENT DOCUMENTS

| | | |
|---|---|---|
| EP | 0344379 | 9/1988 |
| EP | 1024182 A1 | 8/2000 |
| EP | 1046687 A1 | 10/2000 |
| GB | 2240947 A | 8/1991 |

*Primary Examiner*—Mark L. Bell
*Assistant Examiner*—Veronica F. Faison
(74) *Attorney, Agent, or Firm*—Charles R. Malandra, Jr.; Angelo N. Chaclas

(57) ABSTRACT

Ink compositions described are suitable for ink jet printing (ink jet inks) and are highly effective for simultaneously imparting visible and fluorescent images. In the preferred forms, both a dark, visible image and a complementary fluorescent image will be visually discernable as well as machine readable to enable efficient hand and automated processing or handling of the objects printed. These results are achieved by ink formulations that moderate the natural phenomena of quenching while possessing the physical properties necessary for an ink jet ink. In one form, the inks comprise a first colorant comprising a fluorescent dye embedded in a polymeric matrix, the fluorescent dye emitting light within a characteristic emission band when excited by fluorescent-exciting radiation; a second colorant comprising a dye or pigment having a light absorption band at longer wavelengths than the characteristic emission band of the first colorant; and an aqueous liquid vehicle comprising water and a water-soluble vehicle in sufficient amounts to achieve an ink viscosity and surface tension effective for application of the ink to a substrate in a predetermined pattern by ink jet printing. The colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation.

32 Claims, 14 Drawing Sheets

U.S. PATENT DOCUMENTS

| | | | |
|---|---|---|---|
| 5,569,317 A | 10/1996 | Sarada et al. | 106/21 |
| 5,626,654 A | 5/1997 | Breton et al. | 106/31 |
| 5,681,381 A | 10/1997 | Auslander et al. | 106/21 |
| 5,766,324 A | 6/1998 | Ikegaya et al. | 106/31 |
| 5,877,235 A | 3/1999 | Sakuma et al. | 523/161 |
| 6,039,257 A | 3/2000 | Berson et al. | 235/468 |
| 6,063,175 A | 5/2000 | Harris | 106/31 |
| 6,079,327 A | 6/2000 | Sarada | 101/93 |
| 6,083,310 A | 7/2000 | Peterson et al. | 106/31 |
| 6,142,380 A | 11/2000 | Sansone et al. | 235/487 |
| 6,143,807 A | 11/2000 | Lin et al. | 523/161 |
| 6,157,919 A | 12/2000 | Cordery et al. | 705/60 |
| 6,169,185 B1 | 1/2001 | Likavec et al. | 548/305 |
| 6,174,938 B1 | 1/2001 | Miller et al. | 523/164 |
| 6,176,908 B1 | 1/2001 | Bauer et al. | 106/31 |
| 6,284,027 B1 * | 9/2001 | Auslander et al. | 106/31.15 |
| 2002/0047884 A1 * | 4/2002 | Nagashima et al. | 347/100 |
| 2002/0145654 A1 * | 10/2002 | Nagashima et al. | 347/100 |

* cited by examiner

Figure 9A

DRAW DOWNS ON WHITE ENVELOPE

| | PMU | O.D | L,a,b | PRD Red | PCR Red | PRD Green | PCR Green |
|---|---|---|---|---|---|---|---|
| Personal Post Office Red Fl. Ink | 99+ (590)* | 0.68 | L=68.5 A=60.64 B=28.5 | 6% | 0.07 | 35% | 0.46 |
| Ex 1. | 54 | 0.60 | L=57.8 A=0.60 B=5.47 | 41% | 0.47 | 41% | 0.48 |
| Ex 2. | 50 | 0.69 | L=53.8 A=0.03 B=1.41 | 37% | 0.46 | 36% | 0.46 |
| Ex 3. | 61 | 0.64 | L=54 A=-0.45 B=-1.13 | 41% | 0.53 | 39% | 0.51 |
| Ex 4. | 64 | 0.65 | L=54.61 A=-1.74 B=1.10 | 40% | 0.51 | 37% | 0.48 |
| Ex. 5 | 66 | 0.58 | L=57.1 A=3.9 B=2.6 | 46% | 0.62 | 35% | 0.48 |
| Ex. 6 | 54 | 0.60 | L=57.1 A=2.1 B=2.8 | 47% | 0.63 | 34% | 0.48 |
| Ex. 7 | 82 | 0.61 | L=57.48 A=0.77 B=1.56 | 50% | 0.64 | 38% | 0.50 |
| Ex 8 | 98 | 0.65 | L=56.3 A=1.0 B=3.4 | 34% | 0.44 | 33% | 0.43 |
| Ex. 9 | 95 | 0.62 | L=57 A=0.81 B=0.97 | 52% | 0.71 | 38% | 0.52 |
| Ex. 10 | 99+ (105)* | 0.60 | L=56.65 A=1.3 B=0.69 | 52% | 0.71 | 38% | 0.52 |

*Calculated value based on extrapolation as described in evaluation section 3: Fluorescence (PMU).

Figure 9B

POSTAGE METER IMPRINTS ON WHITE ENVELOPES

| Example | PMU (solid) | O.D (solid) | PRD Red (solid) | PCR Red (solid) | PRD Green | PCR Green (solid) | White Ill. White Sub Contrast (datamatrix) | Red Ill. White Sub. Contrast (datamatrix) | White Ill. Kraft Sub. Contrast (datamatrix) | Red Ill. Kraft Sub. Contrast (datamatrix) |
|---|---|---|---|---|---|---|---|---|---|---|
| Personal Post Office Red Fl. Ink | 99+ (214)* | 0.59 | 8% | 0.10 | 28% | 0.39 | 38% | N/A Cannot be seen | 18% | N/A Cannot be seen |
| Ex. 1 | 40 | 0.49 | 26% | 0.34 | 25% | 0.33 | 52% | 61% | 25% | 37% |
| Ex. 2 | 39 | 0.54 | 34% | 0.46 | 31% | 0.43 | 60% | 66% | 29% | 40% |
| Ex. 3 | 52 | 0.48 | 33% | 0.44 | 32% | 0.43 | 52% | 65% | 25% | 41% |
| Ex. 4 | 47 | 0.51 | 34% | 0.45 | 32% | 0.43 | 56% | 66% | 27% | 41% |
| Ex. 5 | 56 | 0.48 | 46% | 0.55 | 37% | 0.45 | 53% | 67% | 25% | 45% |
| Ex. 6 | 44 | 0.50 | 49% | 0.59 | 36% | 0.43 | 52% | 72% | 24% | 42% |
| Ex. 7 | 67 | 0.48 | 46% | 0.55 | 36% | 0.43 | 53% | 69% | 25% | 46% |
| Ex. 8 | 62 | 0.47 | 36% | 0.42 | 36% | 0.41 | 52% | 64% | 24% | 39% |
| Ex. 9 | 69 | 0.46 | 43% | 0.56 | 32% | 0.42 | 53% | 70% | 24% | 43% |
| Ex. 10 | 68 | 0.48 | 42% | 0.55 | 31% | 0.41 | 54% | 71% | 26% | 43% |

*Calculated value based on extrapolation as described in evaluation section 3: Fluorescence (PMU).

Figure 9C

HIGH RESOLUTION PRINTS ON WHITE ENVELOPE

| 1440 x 720 DPI White Sub. | Color (L,a,b) | PMU (small datamatrix) | Fluoromax-2 Fluorescent Intensity (solid area) (cps) | O.D (solid) | PRD Red | PCR Red (solid area) | PRD Green | PCR Green (solid area) | White Ill. Contrast (datamatrix) | Red Ill. Contrast (datamatrix) |
|---|---|---|---|---|---|---|---|---|---|---|
| Personal Post Office Red Fl. Ink | L=65.31 A=65.38 B=28.9 | 99+ (132)* | 551165 | 0.87 | | 0.11 | | 0.48 | 38% | N/A Cannot be seen. |
| Ex. 1 | L=55.14 A=-4.37 B=1.84 | 22 | 142745 | 0.68 | 9% | 0.50 | 38% | 0.50 | 59% | 67% |
| Ex. 2 | L=49.08 A=-1.14 B=-2.15 | 19 | 96482 | 0.78 | 39% | 0.58 | 38% | 0.56 | 65% | 77% |
| Ex. 3 | L=54.18 A=-4.30 B=-0.51 | 25 | 123667 | 0.71 | 45% | 0.54 | 43% | 0.53 | 58% | 73% |
| Ex. 4 | L=54.87 A=-3.72 B=-0.92 | 21 | 166199 | 0.66 | 41% | 0.52 | 39% | 0.50 | 58% | 72% |
| Ex. 5 | L=54.57 A=1.94 B=0.77 | 29 | 154891 | 0.69 | 49% | 0.65 | 38% | 0.52 | 62% | 75% |
| Ex. 6 | L=53.19 A=1.02 B=0.76 | 21 | 109945 | 0.73 | 59% | 0.73 | 39% | 0.55 | 61% | 81% |
| Ex. 7 | L=54.06 A=1.10 B=4.62 | 27 | 148933 | 0.77 | 54% | 0.69 | 43% | 0.56 | 66% | 77% |
| Ex. 8 | L=52.51 A=1.14 B=1.36 | 37 | 232643 | 0.79 | 40% | 0.51 | 43% | 0.48 | 60% | 73% |
| Ex. 9 | L=51.19 A=0.59 B=-0.76 | 39 | 124819 | 0.76 | 57% | 0.73 | 37% | 0.54 | 63% | 83% |
| Ex. 10 | L=49.88 A=-0.96 B=0.63 | 37 | 157520 | 0.86 | 58% | 0.77 | 42% | 0.56 | 64% | 85% |

*Calculated value based on extrapolation as described in evaluation section 3: Fluorescence (PMU).

Figure 9D

HIGH RESOLUTION PRINTS ON KRAFT ENVELOPE

| 1440 x 720 DPI Kraft Sub. | Color (L,a,b) | PMU (small datamatrix) | Fluoromax-2 Fluorescent Intensity (solid area) (cps) | O.D (solid area) | PRD Red | PCR Red (solid area) | PRD Green | PCR Green (solid area) | White Ill. Contrast (datamatrix) | Red Ill. Contrast (datamatrix) |
|---|---|---|---|---|---|---|---|---|---|---|
| Personal Post Office Red Fl. Ink | L=52.22 A=49.17 B=19.62 | 48 | 285890 | 1.09 | 9% | 0.14 | 16% | 0.33 | 26% | N/A Cannot be seen. |
| Ex. 1 | L=46.91 A=5.55 B=14.10 | 21 | 147721 | 0.96 | 27% | 0.43 | 17% | 0.34 | 31% | 43% |
| Ex. 2 | L=41.56 A=4.94 B=14.48 | 19 | 131573 | 1.07 | 35% | 0.55 | 21% | 0.42 | 32% | 51% |
| Ex. 3 | L=46.76 A=2.70 B=16.68 | 19 | 138422 | 1.0 | 30% | 0.50 | 19% | 0.39 | 30% | 46% |
| Ex. 4 | L=48.04 A=1.38 B=17.31 | 21 | 127082 | 0.98 | 32% | 0.50 | 19% | 0.38 | 30% | 50% |
| Ex. 5 | L=45.58 A=10.53 B=18.17 | 26 | 142371 | 0.99 | 38% | 0.60 | 17% | 0.34 | 30% | 50% |
| Ex. 6 | L=47.18 A=9.52 B=21.56 | 19 | 106576 | 1.02 | 42% | 0.66 | 18% | 0.36 | 31% | 56% |
| Ex. 7 | L=45.41 A=9.77 B=19.01 | 24 | 184963 | 1.07 | 38% | 0.63 | 18% | 0.38 | 30% | 52% |
| Ex. 8 | L=52.51 A=1.14 B=1.38 | 32 | 242180 | 1.03 | 29% | 0.48 | 17% | 0.36 | 28% | 44% |
| Ex. 9 | L=43.51 A=6.81 B=13.47 | 31 | 194256 | 1.04 | 43% | 0.69 | 20% | 0.40 | 32% | 53% |
| Ex. 10 | L=40.89 A=5.64 B=9.85 | 30 | 176310 | 1.12 | 43% | 0.72 | 20% | 0.42 | 32% | 54% |

Figure 10

Physical Properties

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Viscosity @ 25 °C (centipoise) | 6.5 | 4.6 | 6.3 | 6.3 | 5.5 | 4.8 | 4.9 | 6.0 | 5.4 | 4.5 |
| pH | 6.1 | 5.8 | 6.1 | 6.1 | 6.3 | 6.3 | 6.3 | 7.3 | 6.0 | 5.9 |
| Surface Tension (dynes/cm) | 37 | 48 | 37 | 39 | 34 | 34 | 34 | 33 | 37 | 44 |

PHOTOSENSITIVE OPTICALLY VARIABLE INK HETEROGENEOUS COMPOSITIONS FOR INK JET PRINTING

This application claims the benefit of Provision application No. 60/290,117 filed May 10, 2001.

BACKGROUND OF THE INVENTION

The invention provides ink compositions for ink jet printing (ink jet inks), which are highly effective for simultaneously imparting visible and fluorescent images. In the preferred forms, both a dark, visible image and a complementary fluorescent image will be visually discernable as well as machine readable to enable efficient hand and automated processing or handling of the objects printed. The invention achieves these results through the development of ink formulations that moderate the typically occurring phenomenon of quenching while possessing the physical properties necessary for an ink jet ink.

It is generally known to employ automated detectors which are responsive to images with high reflective contrast in the visible region of the spectrum for the machine processing of various types of information-bearing tickets, tags, labels, postage indicia and similar security markings. It is further known to employ automated detectors that are responsive to fluorescent emissions of security markings resulting from excitation at a shorter wavelength such as ultraviolet (UV) excitation. In the postage meter art, for example, mail pieces carrying postage indicia printed with fluorescent ink enhance machine processing. In the United States and Canada automatic equipment correctly faces or orients individual mail pieces by detecting red-fluorescence of postal indicia attached to mail pieces. Postal Service facing equipment employs a simple detector to locate the fluorescence. While useful, detectors of this type do not verify that the fluorescence and the indicium image are physically coincident.

Generally, a fluorescent material fluoresces in a defined region of the spectrum upon exposure to a shorter wavelength excitation light such as UV light. As used herein, the term "fluorescent security marking", refers to such an image. Desirably, the marking will be "red-fluorescent", which term is used herein to refer to fluorescence in the red region of the spectrum as opposed to indicating the visible color of the ink. The shift in wavelength between the incident excitation light and the fluorescent emission clearly distinguishes fluorescence from direct reflection. Fluorescent security markings are effectively applied to detection of forged documents, such as tickets, securities, identification cards, security papers, and the like. The difficulty of copying the fluorescence of security markings deters copying and provides forensic evidence of counterfeits. Among the applications of these security markings are detection of articles, production marking, and automatic article identification. Intensity of the fluorescence is important to the success of these applications. Unfortunately, application of inks by ink jet printing so limits the physical properties of the inks that the normal tendency of the colorants in the ink to quench any fluorescence presents a major technical challenge.

The prior art has provided inks for rotary and other letter press postage meters to imprint indicia on envelopes with platens using ink impregnated into foam or other porous media. Red-fluorescent, colored inks have been made for letterpress meters and include red, blue, green and black inks. For example, U.S. Pat. Nos. 2,681,317, 2,763,785, 3,230,221, 3,560,238, 3,928,226 and 4,015,131 disclose red-fluorescent inks for this purpose. These inks, in general, have non-aqueous, solvent-based vehicle systems with low vapor pressures. Typically, they will have a high solids concentration, a high viscosity, a high boiling temperature and a low surface tension.

Unfortunately, letterpress technology lacks the ability of digital printing to print variable information, and the inks are not useful in ink jet printers, which require stable solutions or dispersions with small particle sizes, low viscosity and a specified surface tension. Special inks must be produced before the many advantages of ink jet printing technology can be realized. They must be low in viscosity and have specific surface tension properties to function properly. Beyond that, they must provide high image contrast at low solids concentrations. The viscosity of the liquid ink jet inks is typically from 1.5 to 15 centipoise (cps) in current piezoelectric ink jet printers and about 1 to 5 cps in thermal ink jet printers. A desirable range of surface tension of ink jet printer inks is between 30 to 50 dynes/cm.

These criteria have deterred the development of some fluorescent ink jet inks, but have not permitted any to date that are visually-dark and give high print contrast. A number of red-colored aqueous red-fluorescent inks are disclosed in U.S. Pat. No. 5,681,381 and U.S. Pat. No. 6,176,908, and those inks fulfill United States Postal Service (USPS) requirements for franking while being compatible with use in an ink jet printer. These inks are also stable for extended periods of time. They are based on water, co-solvent and penetrant solutions of water-soluble fluorescent toners. In order to achieve fluorescence with the required fluorescent signal, e.g., phosphor meter unit (PMU), these inks are designed with an optical density lower than that normally required for machine recognition at all wavelengths. These ink formulations are, however, limited in their utilities due to their color and their inapplicability to be black or other dark inks.

Postage indicia and franking machines have been developed to make use of digital printing and especially ink jet printing. They have utilized both dark, high-contrast inks and fluorescent inks separately, but no single dark, high-contrast, fluorescent ink has been available. For example, red and purple-colored, red-fluorescent indicia have been printed with variable data using digital printers. Digitally printed indicia provide significant advantages over letterpress indicia. Ink jet printing enables printing indicia with high-density, variable information. Pitney Bowes' PostPerfect® meter produces a red-colored red-fluorescent indicium with variable data by thermal transfer printing while the Personal Post Office™ system produces red-colored, red-fluorescent indicia by ink jet printing. The USPS "Information-Based Indicia Program" (IBIP) allows the use of a black machine-readable indicia. The Post Office equipment typically orients mail pieces bearing IBIP indicia using a facing identification mark (FIM) or by fluorescent tags added to the indicia. However, because there is no fluorescent black ink available for ink jet printing and using an FIM printed at the edge of an envelope is difficult, the IBIP use is limited.

Postal services utilize machine-readable variable information for a variety of value-added services, for cryptographic authentication of the indicium and for obtaining marketing information. Compared to letterpress technology, digital printers can provide print quality and contrast that do not decrease with the number of prints. The images can be printed at high resolution, with high quality and at high speeds by direct, non-impact print engines. These inks have additional advantages for security markings since they may include penetrating solvents that cause the selective penetration of colorant into the paper. This penetration provides rubbing and scratch resistance to the security markings. Unfortunately, the use of ink jet printing for postage franking is restricted, to some extent, by the present lack of inks functional with ink jet technology that are simultaneously suitable for franking and machine-readability.

Information contained in printed indicia is useful for security and marketing purposes, as well as for processing the mail. In particular, the IBIP contains high-density variable cryptographically protected information in a two-dimensional bar code. To capture this information, postal scanning equipment must efficiently detect and read the information-based indicium. Postal indicia must display sufficient contrast in reflection to enable machine-readability, regardless of the substrate. However, available red-fluorescent inks tend to exhibit low contrast, inhibiting their ability to be reliably read by optical character recognition (OCR) equipment, bar code readers and other types of machine vision technology. These systems often have illumination and detection systems in the red region of the spectrum, limited by laser systems. The substrate can also limit machine readability. On dark substrates, such as Kraft envelopes with a reflectance of between 0.45 and 0.6, it is very difficult to achieve sufficient contrast with red inks. Therefore, there is a strong need for printing security markings which exhibit high contrast, preferably black, and simultaneously fluorescence, particularly red-fluorescence.

Another challenge to the achievement of inks for security features having practical utility is that there are a large variety of commercially-available organic luminescent compounds that might confuse security systems based on currently-available inks. Common examples of these organic luminescent compounds are the optical brighteners and commercially available colored-fluorescent materials and inks—all lighter-colored inks. These might permit fraudulent replication of indicia, e.g., printed in red or green, by substitution of a luminescent substance that emits light of a similar color for an authentic material. This type of normally-available organic luminescent compound could not provide visually-dark and red-fluorescent images. It is, however, another reason why it would be advantageous to provide fluorescent inks with unique optical properties that cannot be easily simulated with materials that are readily available.

The achievement of suitable ink jet inks with suitable physical and fluorescing characteristics presents a major technical challenge because of the physical characteristics required of the fluid ink and a typical fluorescence phenomenon known in the art as quenching. Thus, there are technical reasons why dark, fluorescent inks are not available. The problem of quenching will be explained briefly below.

In the fluorescence process, the absorption of a light quantum by a molecule brings it to an excited singlet state. The time of absorption is about $10^{-15}$ seconds. From the excited, singlet state, light is emitted to the ground level as fluorescence. The $10^{-9}$ second duration of the fluorescence process is much longer than the absorption process. Three separate processes affect observed fluorescence. In one, not quenching, competing light absorption from other dyes can reduce the observed fluorescence due to less light being absorbed by the fluorescent dye. In another, ("trivial mechanism" of quenching) absorption by other dyes of the light emitted by the fluorescent dye will reduce the observed fluorescence. And, in the third, quenching of fluorescence can occur due to resonance energy transfer to other dyes during the $10^{-9}$ second lifetime of the fluorescent dye singlet state. Thus, quenching and non-quenching phenomena can work to decrease observed fluorescence.

The lifetime of a fluorophore can be related to the concentration of a quencher by the Stern Volmer equation, $\tau_0/\tau=1+K_{SV}(Q)$, where $\tau_0$ is the lifetime of the fluorophore in the absence of the quencher, $\tau$ is the lifetime of the fluorophore in the presence of the quencher, $K_{SV}$ is the Stern Volmer constant and Q is the quencher concentration. As the concentration of the quencher increases, the excited state of the fluorophore is quenched causing a reduction in the lifetime.

One quenching mechanism is transfer of the energy absorbed by a donor molecule to an acceptor molecule. Unless the acceptor molecule is a fluorophore, i.e., a fluorescent dye, the energy transfer process will deactivate the excited state and quench the fluorescence. If the acceptor is a fluorophore, the energy transfer can excite the acceptor, which then fluoresces at a longer wavelength. This process of donors fluorescing in the short-wavelength, visible region of the spectrum while the absorption spectra of the acceptor overlaps the emission spectra of the donor and, as a result, the acceptor fluorophores fluoresce more strongly at longer wavelengths, is known as cascading. The selection of a mixture can also result in the absorption spectrum of the acceptor overlapping the fluorescence spectrum of the donor. In such a case, the resultant effect is the sensitization or enhancement of the light emission of the acceptor.

In order to achieve a conventional black ink based on water-soluble dyes, a single dye or a mixture of dyes is required which will absorb across the entire visible spectrum, from 390 nm to ca. 680 nm. If a single dye is to be used, it must exhibit very broad absorption and/or multiple visible absorption bands. If mixed dye systems are to be used, this would require at least two dyes (orange and violet with broad absorption bands), or more usually three dyes (e.g. yellow, purple and blue). Such a mixed black system would not normally show red-fluorescence, both because of competition among the various dye components for the UV light and because of efficient quenching of the fluorescence. The quenching results from energy transfer to those non-fluorescent dyes in the composition that have absorption bands overlapping with the emission band of the fluorescent dye, most significantly to the blue dye component of the mixture. Such energy transfer could occur by collisional transfer where the non-fluorescent acceptor diffuses to the donor, at a distance by resonance transfer, or by the so-called "trivial" mechanism whereby the blue dye absorbs any red emitted light. Similar problems exist with available inks based on the use of one or more pigments or dyes.

From the above discussion, it can be seen that currently-available inks for ink jet printing cannot provide high-contrast visible images as well as fluorescent images suitable for security markings. There remains a technical challenge to the provision of such inks, which would be highly desirable if available.

SUMMARY OF THE INVENTION

Thus, it is an object of this invention to provide a photosensitive optically-variable, e.g., fluorescent, ink jet ink which produces a high contrast, e.g., machine-readable, image in reflection.

Another object of the invention is to provide a means to inhibit the normal quenching of fluorescence that deters the production of a useful fluorescent ink jet ink capable of producing a high contrast machine-readable image in reflection.

It is another object of the invention to provide a multi-component ink formulation of the type described with components that differentially adhere to the paper substrate, thus making alteration or non-destructive transfer to a counterfeit document extremely difficult.

It is another object of the invention to provide fluorescent inks with unique optical properties that cannot be easily simulated with materials that are readily available.

It is yet another object of the invention to provide an ink of the type described useful as a forensic verifier in that it can verify that the dark regions and the fluorescent regions of a security marking are coincident.

These and other objects are achieved by the invention which provides inks suitable for ink jet printing, a process for preparing such inks, printing process using the inks and printed substrates bearing images printed with the inks.

In one aspect, an ink of the invention will be defined as a heterogeneous, aqueous ink capable of producing dark, machine-readable markings exhibiting fluorescence when exposed to fluorescent-exciting radiation, the ink being of suitable viscosity and surface tension for use in ink jet printing, comprising: (a) a first colorant comprising a fluorescent dye embedded in a polymeric matrix, said fluorescent dye emitting light within a characteristic emission band when excited by fluorescent-exciting radiation; (b) a second colorant comprising a dye or pigment having a light absorption band at longer wavelengths than the characteristic emission band of the first colorant; and (c) an aqueous liquid vehicle comprising water and a water-soluble vehicle in sufficient amounts to achieve an ink viscosity and surface tension effective for application of the ink into a substrate in a predetermined pattern by ink jet printing; wherein, the colorants are present in combination in the aqueous ink in amounts effective to cause the ink, when dry, to exhibit a color due to the net absorption spectra of the colorants in the visual range and machine-readable or visually-discernable fluorescence when subjected to fluorescent-exciting radiation. Desirably, within the spectral range of interest of from 400 to 680 nm, the ink reflectance is less than 50% of the paper reflectance.

Many preferred and alternative aspects of the invention are described below.

BRIEF DESCRIPTION OF THE DRAWINGS

The invention will be better understood and its advantages more apparent when the following detailed description is read in light of the accompanying drawings, wherein:

FIG. 9A is a table of reflectance and fluorescence characteristics of drawdown-prepared applications on white paper of example heterogeneous inks compared with a traditional meter ink.

FIG. 9B is a table of reflectance and fluorescence characteristics of meter imprints of example heterogeneous inks compared with a traditional meter ink.

FIG. 9C is a table of reflectance and fluorescence characteristics of meter imprints of example heterogeneous inks printed at high resolution on white envelopes compared with a traditional meter ink.

FIG. 9D is a table of reflectance and fluorescence characteristics of meter imprints of example heterogeneous inks printed at high resolution on Kraft envelopes compared with a traditional meter ink.

FIG. 10 is a table of physical properties of example heterogeneous inks.

DETAILED DESCRIPTION

Figure 1:
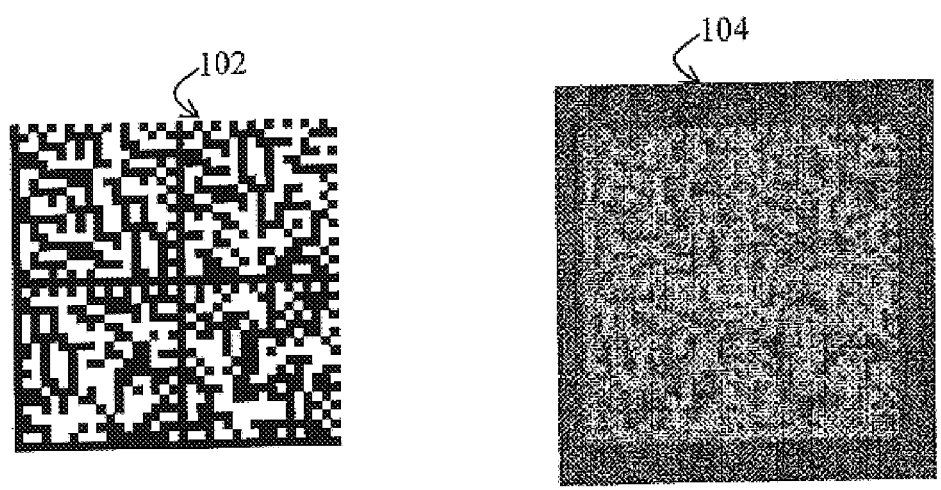
FIG. 1 illustrates both visible and fluorescent images enabled by printing the inks of the invention on a substrate, one of a printed substrate in reflection under illumination by visible light and one of the same printed substrate fluorescing under ultraviolet excitation.

The ink compositions of the invention are illustrated below in preferred forms and are, in these forms and others, highly effective for ink jet imprinting visible and fluorescent images, both preferably being machine readable. The visible images are clear to normal human sight and effective for use with various image-reading machines operable for light in the visual range. The images are also sufficiently fluorescent, despite quenching due to the presence of colored dyes or pigments, to provide machine-readable fluorescent images which are substantial negatives of the visible images. Before providing specific examples of inks, the principal components of the inks will be described. Desirably, within the spectral range of interest of from 400 to 680 nm, the ink reflectance is less than 50% of the paper reflectance.

The inks of the invention are capable of imagewise application by ink jet printing and of providing machine-readable images when exposed to visible and fluorescent-exciting radiation. For an ink to be effectively used by ink jet printing, it must have a suitably low viscosity, yet have sufficient solids for it to achieve sufficient fluorescence and visible light reflectance to provide discernable images when dried. Preferably, the dry inks will provide machine-readable images on a wide variety of substrates.

The inks of the invention include a mixture of colorant components, at least one fluorescent and comprising a means to inhibit the normal quenching of fluorescence. Quenching deters the production of a fluorescent ink jet ink capable of producing a high-contrast, preferably machine-readable, image in reflection. The invention reduces quenching and achieves visible contrast with fluorescence by creating an obstacle to the diffusion of a quencher to an excited fluorophore. This is achieved by immobilizing a fluorescent molecule by a polymeric matrix.

Ink compositions of the invention will include a multi-component colorant mixture and a liquid carrier. Typically, the inks of the invention will contain an aqueous liquid component and a mixture of colorants. In all cases, the inks will contain a colorant (referred to as the first colorant) which is fluorescent when exposed to fluorescent-exciting radiation. In addition, the inks will contain a combination of other colorants, dyes and/or pigments, which together impart a high-contrast, visibly-dark image on a variety of substrates. Preferred inks will produce a virtually black image but can be characterized by other dark colors such as gray, blue or purple. The inks of the invention have the advantage that they impart machine-readable images when illuminated with both visible light and fluorescent-exciting radiation. Desirably, the images are of high definition on coated and uncoated papers in a wide range of colors and hues, including at least the range of from white to manila and kraft paper.

Image readability is characterized in a number of ways. A scanner responds to the difference between light reflected from the printed indicia and the background. This difference is defined as print reflectance difference (PRD). A PRD of at least 40 percent in the scanning region of interest (SROI) is necessary for reading indicia, while visually read inks require only a PRD of about 30 percent. The ratio between PRD and the background reflectance is called print contrast ratio (PCR) or print contrast signal (PCS). The print contrast signal PCS (also, PCR) is preferably greater than 0.30, for white and kraft papers with the red or green filters, when measured with the Envelope Reflectance Meter from the USPS. For white paper with red filter, values of greater than 0.45 are desired, e.g., 0.47 and above, e.g., 0.47–0.8, and essentially the same values with a green filter, e.g., 0.46 and above, e.g., 0.46–0.6 For kraft paper, it is preferably greater than 0.30, e.g., 0.33–0.5 for a green filter and 0.40 and above, e.g., 0.43–0.8, with a red filter.

For the purposes of the invention, the CIE scale described below under the heading "Evaluation 2: Color". The L value is a measure of light and dark, while the a and b values are a measure of color. Neutral color would be represented by a=0 and b=0, with the color shifting from gray to black as the L value decreases. Using this scale, preferred inks of the invention will have values in the range of L=(<57), a=(−5 to 5), b=(−5 to 5) and preferably in the range of L=(55), a=(−1 to 1), b=(−1 to 1). Other values are within the invention so long as the reflectance in red or green SROI is less than 25%, preferably greater than 30%. Desirably, within the spectral range of interest of from 400 to 680 nm, the ink reflectance is less than 50% of the paper reflectance.

As noted above, pigments capable of imparting high-contrast images when illuminated by light in the visible range cannot be easily combined with fluorescent dyes because they tend to quench the fluorescent emissions. The compositions of the invention achieve a decreased quenching and thus a higher degree of detectable fluorescence by providing a degree of physical separation between the fluorescent materials and the other colorants.

While the fluorescent material can have fluorescence at any detectable wavelength, it is preferred according to the invention that fluorescence be in the red range, e.g., from 570 to 620 nm, due to the availability of detecting and reading equipment effective in this range. Accordingly, the inks of the invention will preferably contain a fluorescent particle dispersion capable of red-fluorescence when exposed to fluorescent activating radiation. Preferred particles of this type are produced by emulsion polymerization to immobilize, e.g., by embedding, a fluorescent dye or other colorant therein and thereby provide a physical separation of the fluorescent material from the dark colorants or their components.

Preferably, the polymers used for embedding fluorescent dyes are prepared by emulsion polymerization, especially vinyl type of emulsion polymerization (EPP). These polymers including the dyes for our examples are typically red or orange and can be designated EPPR or EPPO, respectively. An emulsion polymerization reaction mixture comprises at least two immiscible liquid phases: an aqueous, continuous phase and a non-aqueous, discontinuous phase containing both unreacted monomer and the polymer. There are various emulsion polymerization products of various polymer types including those prepared from non water-soluble monomers of the vinyl type, nitrile-type, as well as those prepared from water-soluble monomers. The reaction mixtures will typically contain surfactants, initiators, and like components. The surfactant forms micelles (aggregates of 50–100 surfactant molecules). At the beginning of the reaction, polymer is formed in the surfactant micelles. As polymer continues to form, the micelles grow by the addition of the monomer from either dissolved or dispersed monomer. The size of the particles formed is controlled and small (0.1 to 1 u) due to the limitations of the micelles size, the immiscibility of the two phases and of dispersants used to stabilize the emulsion.

When a fluorescent dye is immobilized, such as by incorporation into a polymer structure by emulsion polymerization or other technique, the small polymer particles become fluorescent particles having the same color in visible light as does the fluorescent dye. While possible in some situations, the inclusion of colorants other than the fluorescent dye is not preferred and is preferably avoided to the substantial absence of other dyes. A specific process of preparation of the fluorescent particles is described in the patents U.S. Pat. No. 5,294,664 and U.S. Pat. No. 5,215,679. The fluorescent particles described are specifically of the vinyl emulsion polymerization type. The surfactants or emulsifiers play an important role in forming micelles, which incorporate the monomers from the non-aqueous phase. The water-continuous emulsion polymerization of vinyl type monomers is a well-known polymerization technique, which produces particles in the 0.1 to $1\mu$ range. The polar polymer matrix is a good solvent for the fluorescent dyes in order to achieve a high fluorescent signal. Examples of the fluorescent dyes used in these dispersions are dyes that fluoresce in red, green or yellow such as: Basic Red 1 and 1—1, C. I. Basic Violet 10 and 11:1, Cation Brilliant Red, Cation Brilliant Pink, Spilon Yellow, Spilon Red manufactured by Hodogaya Chemical Co., C. I. Basic Yellows 35, 95 and 40 and Solvent Yellow 131. Examples of the fluorescent particle dispersions obtained by emulsion polymerization used in these formulations follow.

ECX-13 Rocket Red or ECX-15 Blaze Orange manufactured by Day Glo or Lumikol NKW 3204C Orange or Lumikol NKW 3203C Red dye manufactured by Nippon Keiko Kagaku (N.K.K.) and distributed by United Mineral Colour.

The extra color strength product from Day Glo ECX-13 contains fluorescent particles, resin, surfactant and water, with 45% solids in an aqueous dispersion by weight. It has a viscosity of 21 centipoise (cps), a Hegman Grind of 6, a Horiba particle size of 0.197 microns and a pH of 6.75. The ECX-15 has 45% solids in an aqueous dispersion with a viscosity of 29 cps, a Hegman Grind of 6, Horiba particle size of 0.152 microns and a pH of 6.25. The Hegman Grind Gage can be considered essentially a continuous variable screen from 0.004 inch depth channel at the "0" calibration to "8" at the infinite point where the path runs out to the surface of the gage. On this scale, higher numbers indicate finer particles. The aqueous fluorescent particle comprises water insoluble polymers of at least four monomers. The first polymer is formed from a water insoluble vinyl monomer free of polar groups. The second is a vinyl nitrile monomer and the third a vinyl monomer containing at least one sulfonate group. The final polymer is formed from a polar vinyl monomer of acrylate ester or methacrylate ester or acetate or a substituted acrylamide containing hydroxyl or carboxylic ester groups. The typical fluorescent dyes include: Basic Red 1, Basic Violet 11, Basic Yellow 35, 40, 95 and Solvent Yellow 131.

The Lumikol NKW 3204C Orange and Lumikol NKW 3203C Red, identified above, are manufactured by N.K.K. and are available as very fine aqueous dispersions of fluorescent particles containing monomeric mixture of acrylonitrile, styrene and methacrylic acid including such dyes as Rhodamine B, Rhodamine 6G, Ciba-Geigy AG and Bayer AG. This emulsified polymeric mixture is described in the European Patent Application EP 0 344 379 A2. The two Lumikol materials have 37% solids, viscosity of 11.0 cps, pH of 5.9, particle size distribution in the range of 0.04 to 0.2 microns and surface tension of 44 dyne/cm.

The second component of the mixture consists of blue or purple dyes (BD) or fluorescent particles that form a subtractive mixture with the yellow and the red dye. As a result of their combination a dark gray or black color is obtained. Examples of the blue dyes are as following: Acid dyes such as C.I. Acid Blue 9, direct dyes such as: C. I Direct 199 for ink jet (Projet Cyan), Duasyn Direct Turquoise Blue FRL-SF liquid dyes(similar to direct blue 199). The other category of blue colorant additives are blue pigments (BP) as following: The example of blue pigment is Acryjet Cyan (Pigment blue 15:3) manufactured by Rohm and Haas or Hostafine Blue manufactured by Clariant Inc.

The colorants are present in combination in the aqueous ink in amounts effective to cause the ink, when dry, to exhibit a color due to the net absorption spectra of the colorants in the visual range and machine-readable or visually-discernable fluorescence when subjected to fluorescent-exciting radiation. The preferred inks will exhibit a net effect between fluorescence and quenching by the other components of the ink when dry provides a phosphor meter reading of at least 7. Also, preferably, the inks will contain colorants selected such that the ink when dry will exhibit a print reflective difference of at least 0.3.

The inks will contain an aqueous liquid vehicle comprising water and a water-soluble vehicle in sufficient amounts to achieve an ink viscosity and surface tension effective for application of the ink to a substrate in a predetermined pattern by ink jet printing. For thermal ink jet printing, the viscosity should be within the range of from 1 to 5 cps when measured Haake Viscotester at 25° C. (see test method below), preferably from 2 to 4.5 cps, and exhibit a surface tension of from 20 to about 80 dyne/cm when measured by Fisher Surface Tensiomat at 25° C. (see test method below), preferably from 30 to 50 dyne/cm. For ink jet printing by piezoelectric means, the viscosity should be within the range of from 1.5 to 15 cps when measured by the above method, preferably from 2 to 12 cps.

The solvent system of these inks will typically comprise organic polar solvents and water. The organic polar solvents are all soluble in water. The solvent's polarity is a function of the solvating properties, which in turn is a measure of the sum of the molecular properties responsible for the interaction between the solute and solvent. One group of solvent additives belongs to glycol humectants (GH) were selected because their water absorbing hygroscopic properties namely; ethylene glycol, propylene glycol, diethylene glycol, polyethylene glycol (PEG) and glycerin. The other category of humectants includes other materials such as powerful surfactant humectants (SH) which prevent drying of the ink jet in the nozzles when exposed to air and an example is the Nuosperse (surfactant, ethoxylated oleyl alcohol, alkyl polygycol, tridecyl alcohol ethoxylated, phosphated sodium salt).

The glycol ether type solvents (GE) were selected depending on the environment because they act as a bridging agent with various polarity resins or other components and assume polar or non-polar nature depending upon the environment. The glycol ethers also provide better penetration into paper substrates and also aids in fixing the ink to the paper thus improving water fastness. The examples of this type solvent are propylene glycol butyl ether, diethylene glycol butyl ether, diethylene glycol propyl ether, triethylene glycol ethyl ether and triethylene glycol mono-n-butyl ether.

Another series of solvents were selected based upon a high dipole moment and high hydrogen bonding solubility parameters (highly polar solvents HPS) such as 2 pyrrolidone, N-methyl pyrrolidone, sulfolane, gammabutylactone, 4-methylmorpholine-n-oxide and dimethylsulfoxide. All these solvents are nonvolatile, polar, hygroscopic and dissolve in water causing an increase in viscosity.

The ink carrier can also optionally contain resins such as low molecular weight resins (LMWR) polyvinyl alcohol, polyvinylpyrrolidone (K12), dimethylhydantoin or other water-soluble resins. An optional second colorant material, according to the present invention, comprises Duasyn Red 3B-SF (Reactive Red 23) NFRD (Non-Fluorescent red dye) liquid dye, Basic Yellow (fluorescent yellow dye(FYD or other fluorescent dyes added to the emulsion polymerization fluorescent products. Examples of the blue dyes added to the formulations are: Duasyn Direct Turquoise Blue FRL-SF liquid dye, Projet Fast Cyan 2, Acid Blue 9, and the like.

The formulations, making methods and evaluations disclosed herein below are for illustrative purposes only. Other embodiments of the present invention will become apparent to those skilled in the art, from consideration of the detailed description.

For the purpose of providing guidance in the formulation of inks according to the invention a generalized description of some principal components is described in the following table. In all cases, the ranges are approximate, and the various components will be employed in suitable amounts, with the others, to achieve their individual functions and the overall objectives of the invention sought for a particular ink.

| INGREDIENT | Amount (wt. %) Typical |
|---|---|
| Fluorescent Pigment Dispersion (red or orange emulsion polymerization pigment) | 25 to 65 |
| Water soluble organic solvents | 10 to 20 |
| One or More Dyes (optional) | Up to 1 |
| Blue Colorant (dye or pigment) | 0.1 to 13 |
| Low Molecular Weight Resin (optional) | Up to 1 |
| Distilled water | 15 to 60 |

The colorant components used in formulating the heterogeneous inks of the invention are preferably selected from a group comprising a red-fluorescent pigment, a blue dye or a blue pigment, optionally a yellow dye and a red dye. The red-fluorescent pigment can be a dispersion of the vinyl emulsion polymerization type. The ECX fluorescent pigment dispersions, described above, are prepared by a vinyl emulsion pigment technology. They contain water-insoluble vinyl monomers free of polar groups, acrylonitriles or other equivalent vinyl nitrites, vinyl monomers with sulfonate groups and polar vinyl monomers such as polar acrylate esters and fluorescent dyes. Typical fluorescent dyes include: Basic Red 1, Basic Violet 10, Basic Violet 11, Basic Yellow 40, and Solvent Yellow 44. The pigment also contains an emulsifier in order to emulsify the water insoluble resultant tetrapolymer. Examples of the fluorescent pigment dispersion are Day Glo ECX series Rocket Red, Blaze Orange and Lumikol NKW Red, Orange, Yellow. The blue dyes are acid and direct dyes purified for ink jet use such as CI Acid Blue 9, Duasyn Blue FRL-SF (Direct Blue 199), Profast Cyan 2(Direct Blue 307 or any blue dye with an extinction coefficient higher than 10,000 soluble in water. An example of a blue pigment is Pigment Blue 15:3. Examples of yellow and red dyes are Basic Yellow 40 and Reactive Red 23.

The carrier preferably can include water (preferably, distilled) and one or more humectants, penetrants, polar solvents, soluble resins and the like. The various liquid and solid components should be used in amounts effective to provide the physical and light reflecting and fluorescing properties described above and illustrated in the examples, which follow.

Humectants of the glycol type are glycerin, PEG, Triethylene Glycol, Ethylene, Glycol, Propylene glycol, and Diethylene Glycol. Penetrants include glycolethers: Tripropylene n-butyl ether, Diethylene Glycol Monobutyl Ether, Diethylene Glycol Methyl Ether, Dipropylene Glycol Methyl Ether, Tripropylene Glycol Methyl Ether (other glycolethers). Polar solvents with high polar and hydrogen bonding solubility parameters include Dimethylsulfoxide, 2Pyrrolidone, and Gamabutyrlactone. Optional low molecular weight water-soluble resins include Polyvinylpyrrolidone K 12, polyvinyl alcohol and dimethylhydantoin polymer.

With the above description as background, more discussion is presented utilizing the Figures to point out some of the principles of significance to the invention.

FIG. 1 illustrates both visible and fluorescent images enabled by printing the inks of the invention on a substrate, one of a printed substrate in reflection under illumination by visible light and one of the same printed substrate fluorescing under ultraviolet excitation.

The term Photosensitive Optically Variable (POV) security marking as used herein refers to a printed visually black or dark gray machine-readable information-bearing marking that fluoresces in a specific wavelength range when excited with a shorter wavelength light. The POV security marking exhibits visual light absorption throughout the entire visual spectrum including the red region of the visible spectrum where red inks are invisible to typical automatic scanning systems. These inks will achieve acceptable PCS (Print Contrast Signal) on dark papers such as Kraft or Manila.

An application of a POV security marking in the field of postage evidencing is a black postage indicium that fluoresces in the red region of the spectrum when illuminated with ultraviolet light. FIG. 1 shows machine-scanned images 102 and 104 of a POV security marking including a Data-Matrix bar code. Any other symbology such as a one-dimensional bar code, other types of two-dimensional bar code, printed watermarks, or OCR characters may be employed in a POV security marking. The image scanned in reflection 102 was obtained by illuminating the marking with visible light. The low reflectance of the black ink results in dark areas of the scanned image corresponding to printed areas of the security marking. The image scanned in fluorescence 104 is obtained by viewing the visible red-fluorescent emissions under ultraviolet (UV) illumination. The scanned image 104 shows that the security marking emits visible light when illuminated with UV light resulting in light areas in the scanned image corresponding to the printed areas. Comparison of images 102 and 104 shows that the fluorescing image is a negative of the reflective image, i.e., there is a strong negative correlation between the two images.

Forensic characteristics are important to value metering applications such as postal payment and to other security applications. Other security applications of fluorescent inks include security papers and documents. Thus, even after the removal of the visible dark color the remaining fluorescent image 104 will provide forensic evidence of what was printed. In the present invention, the difference in penetration between the fluorescent and non-fluorescent components provides forensic evidence of the presence of the marking after the visible components have been removed.

A security marking printed with a general purpose black ink is easily copied or modified. Verification of the authenticity of the data such as by verifying a cryptographic digital signature included in the bar code data can detect data modification, but not copying. The machine-readable fluorescent ink disclosed herein provides a barrier against undetectable copying. Frequently, fluorescence is added to colored inks to increase the brightness. There is no general commercial incentive to produce visually dark fluorescent inks for graphics purposes, so the machine-readable fluorescent ink can be a unique controlled supply item for the specific intended purpose.

These POV security markings may be produced by digital printing., thermal transfer or electrophotography. In particular, the markings may be produced with the water-based inks disclosed herein through ink jet printing.

Figure 2:
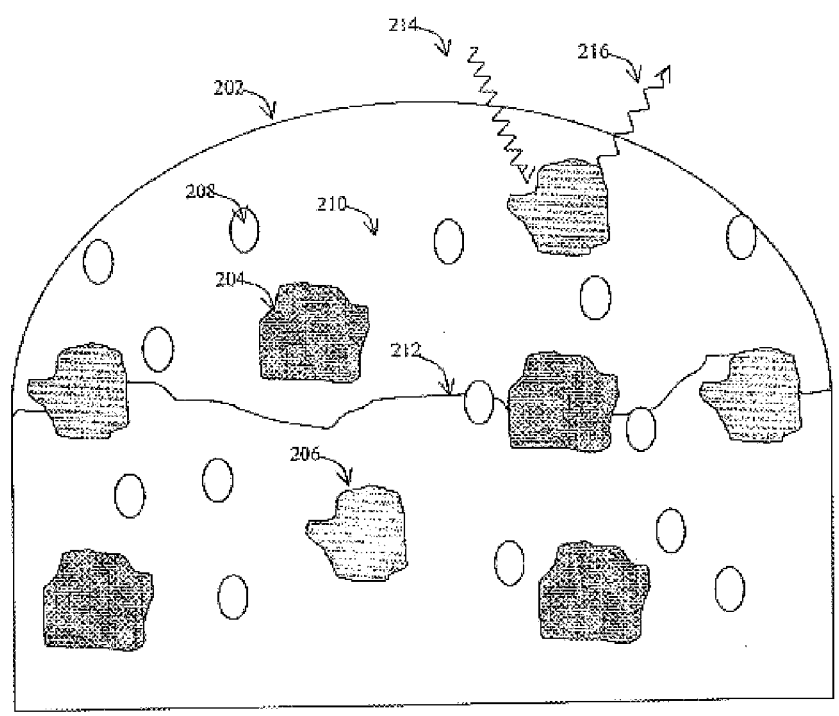
FIG. 2 is schematic illustration, in cross section, of a heterogeneous ink sample penetrating paper.

FIG. 2 is schematic illustration, in cross section, of a heterogeneous ink sample penetrating paper. Fluorescence in fluids is typically quenched by transfer of the energy absorbed from the excitation source to neighboring non-fluorescing particles. One method to limit quenching is by maintaining a physical separation between the fluorescing particles and the particles which could absorb the excitation energy, i.e., by steric hindrance. FIG. 2 shows schematically an example of a heterogeneous ink drop shown generally at 202. The drop 202 of this example comprises fluorescent particles of different colors consisting of fluorescent dyes attached to a polymeric matrix such as one obtained by emulsion polymerization shown at 204 and 206 and a dye 208 of yet another color. The ink drop is shown penetrating a paper substrate at 212. The fluorescent particles and dyes are distributed in a water-based carrier 210. The concentrations of fluorescent particles and dyes are balanced to obtain a visual black color when illuminated with white light. While the heterogeneous ink shown in FIG. 2 comprises two fluorescent particles and one dye, it will be obvious to those skilled in the art that a heterogeneous ink can contain one or more fluorescent particles as well as non fluorescent particles (pigments) and does not necessarily contain a dye.

The ink drop 202 is illuminated with an excitation light 214 which may be UV light. The excitation light 214 excites one of the fluorescent particles 204 or 206 which then emits longer wavelength light 216. There is a strong tendency for collisions between particles in the fluid to quench the fluorescence by transferring the energy absorbed from the excitation light 214 by fluorescent particles 204 and 206 obtained by attaching the fluorescent dyes to a polymeric matrix to other particles. The relatively large size of the fluorescent particle particles 204 and 206 provides steric hindrance thus reducing the quenching process. Further, the fluorescent dyes are attached to the polymer matrix of particles 202 and 204 formed in the emulsion polymerization process.

Figure 3:
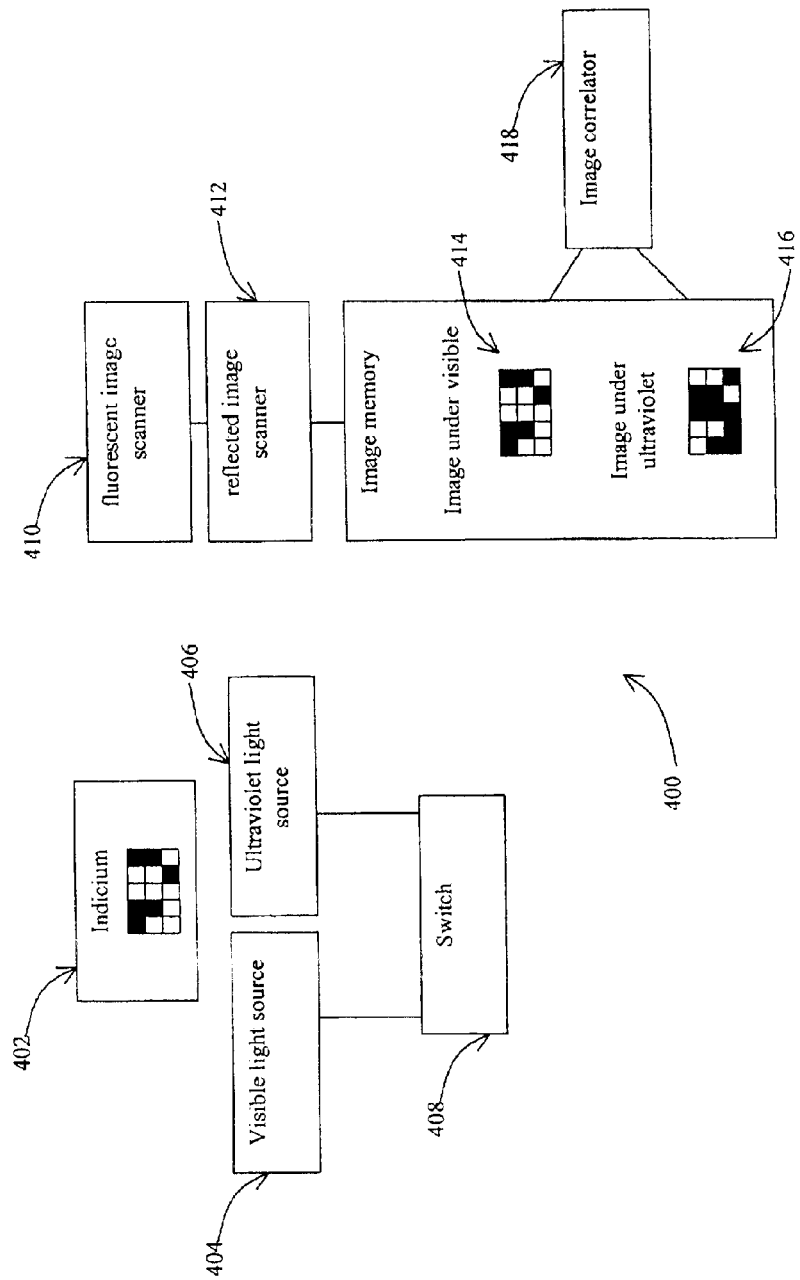
FIG. 3 is a schematic illustration of a system for scanning an optically variable image comprised of the ink of the invention printed on a substrate.

FIG. 3 is a schematic illustration of a system for scanning an optically variable image comprised of the ink of the invention printed on a substrate. Verifier systems that read and verify the indicium bar code data can check that the data in the bar code is self-consistent and consistent with the other information associated with this application. In the postage-evidencing field, for example, An IBIP indicium contains a cryptographic digital signature and contains information about the postage meter, the mailer and the recipient of the mail piece. Such verifiers can only detect duplicates by comparing the indicium data with the data in all previously detected indicia. This is an expensive and cumbersome process. Such a verifier system cannot directly verify if the indicium is original.

A POV security marking is shown generally at 402. A forensic verifier 400 for authenticating the security marking 402 is a specialized verifier system that checks the forensic properties of the security mark in addition to verifying the data. The forensic verifier thus provides a direct check of the originality of the security marking.

A counterfeiter without access to a printer with machine-readable fluorescent ink can produce a security mark that fluoresces and is machine-readable by printing the copied indicium over a fluorescent background, or by applying a fluorescent material over the copied indicium. In either case, the original and copied indicia are distinguishable. A forensic verifier system will make this distinction as described herein.

A manual forensic detection system can be simply a visible light source and an ultraviolet source with a switch that can switch between the two sources. An operator can view the indicium under the two light sources and verify the fluorescence of the image and the non-fluorescence of the background under ultraviolet illumination.

An automatic forensic verifier system 400 will similarly include two light sources and two image memories for the image under each illumination source. The first light source 404 is a long wavelength light source, such as a visible or infrared source used for reading the indicium data. Preferably, the spectrum of visible light source is concentrated in a region of the spectrum where the machine-readable fluorescent ink has high optical density. The second light source 406 excites the indicium fluorescence with a shorter wavelength source such as ultraviolet light. When scanning security marking a switch mechanism 408 alternates the light source between the visible and ultraviolet sources. The forensic verifier collects a visible image with the reflected image scanner 412 and stores it in the verifier memory at 414. The forensic verifier collects an image of the fluorescent emissions with a fluorescent image scanner 410 and stores it in another region of the forensic verifier memory at 416. The fluorescent image scanner 410 and the reflected image scanner 412 may be the same physical device, or may be separate devices designed to optimize collection of the corresponding image. The forensic verifier uses an image correlator 418 to compare the images of the indicium saved in memory at 414 and 416. An image correlator 418 measures the correlation between the image optical density under visible light with the fluorescent image under ultraviolet illumination. A threshold is set to provide an alarm if the fluorescence is too low or non existent or if the fluorescent image is not correlated properly with the visible image.

When an original indicium is illuminated with visible light, the image is dark against the bright background of the paper. When the original indicium image is illuminated with the ultraviolet light source, the indicium image is bright against the low fluorescence background of the paper. Similarly, a copied indicium illuminated with visible light appears dark against a light background. Contrary to the properties of an image of an original indicium under ultraviolet illumination, a copied indicium printed on a fluorescent background or overprinted with fluorescent material and illuminated with ultraviolet light will show a dark image against the bright fluorescent background.

Figure 4:
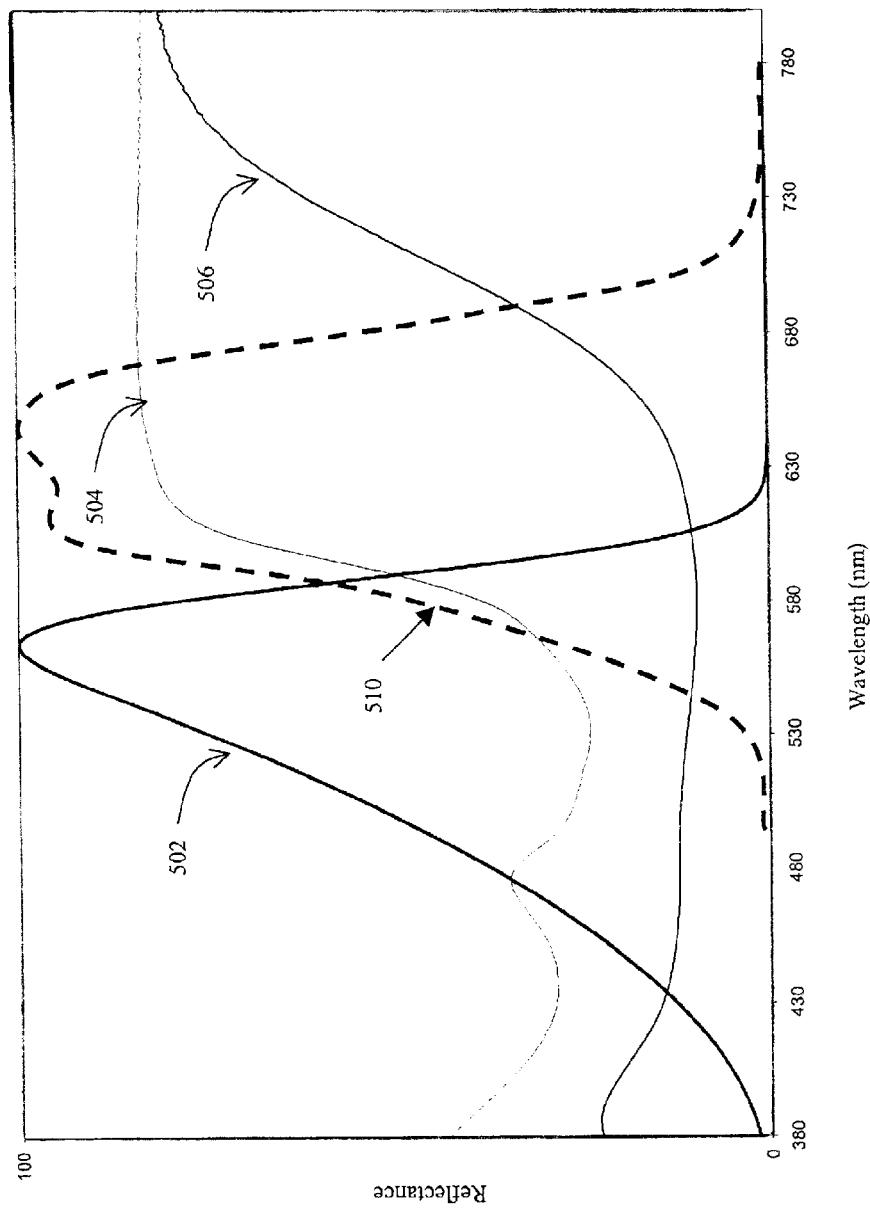
FIG. 4 is a graph illustrating a reflection spectra for example black and red inks superimposed on the spectral factor of an orthochromatic filter.

FIG. 4 shows a reflection spectra for example black and red inks superimposed on the spectral factor of an orthochromatic filter. FIG. 4 shows percent reflectance of red 504 and black 506 ink versus wavelength in nanometers and a normalized sensitivity factor 502 for the scanner. There is an advantage of black ink over red ink for machine readability. The relevant values of ink and paper reflectance are obtained by averaging the respective reflectance spectra 504 and 506 weighted by the spectral factor of the scanning system 502. Line 510 illustrates characteristics with a red filter. The spectral factor is the normalized product of the illuminant spectrum, the spectral response of the image capture device and the spectral characteristics of the associated optical filters. The resulting averaged reflectance of the black ink is R=11% and the reflectance of the red ink is R=31% in the green region. If the reading is done in the red region of the spectra, the red ink is invisible (R~80%). Examination of the relationship between the scanner spectral factor and the reflectance spectra of the red ink reveals an overlap spectral region where both the scanner spectral factor and the ink reflectance are substantial. The scanner therefore detects a significant reflection from the red ink. The black ink reflectance is low where the scanner spectral factor is high, and thus the scanner will detect low reflectance of the black ink.

Figure 5A:
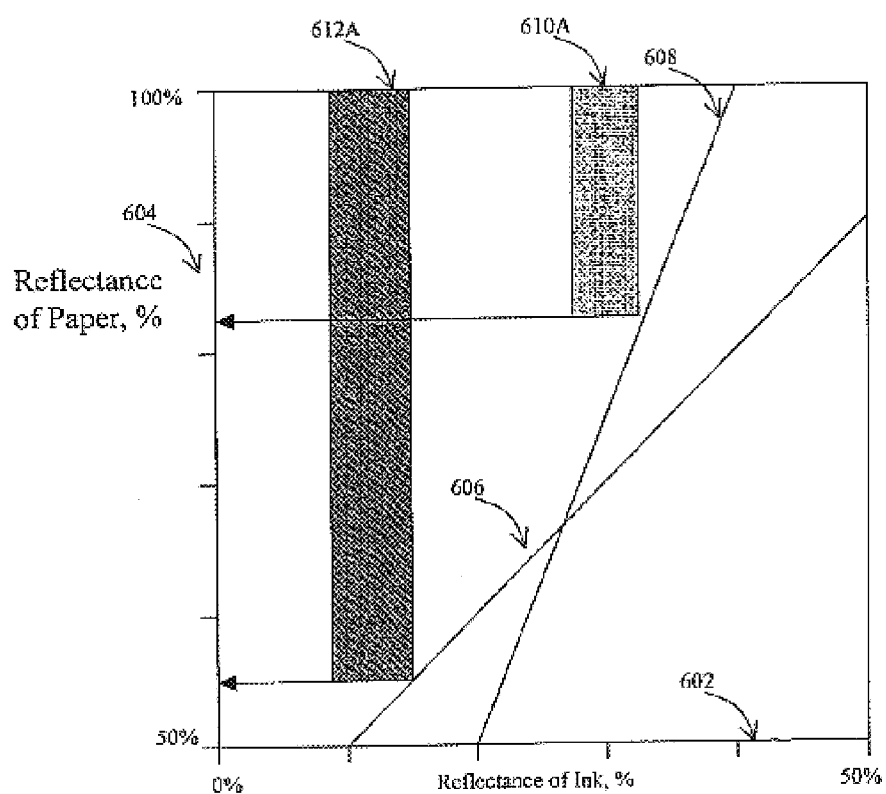
FIGS. 5A and 5B are graphs illustrating the range of black and red ink reflectivity that provides readability with a typical machine vision system. 5A shows the results with red filter and 5B, with green.
Figure 5B:
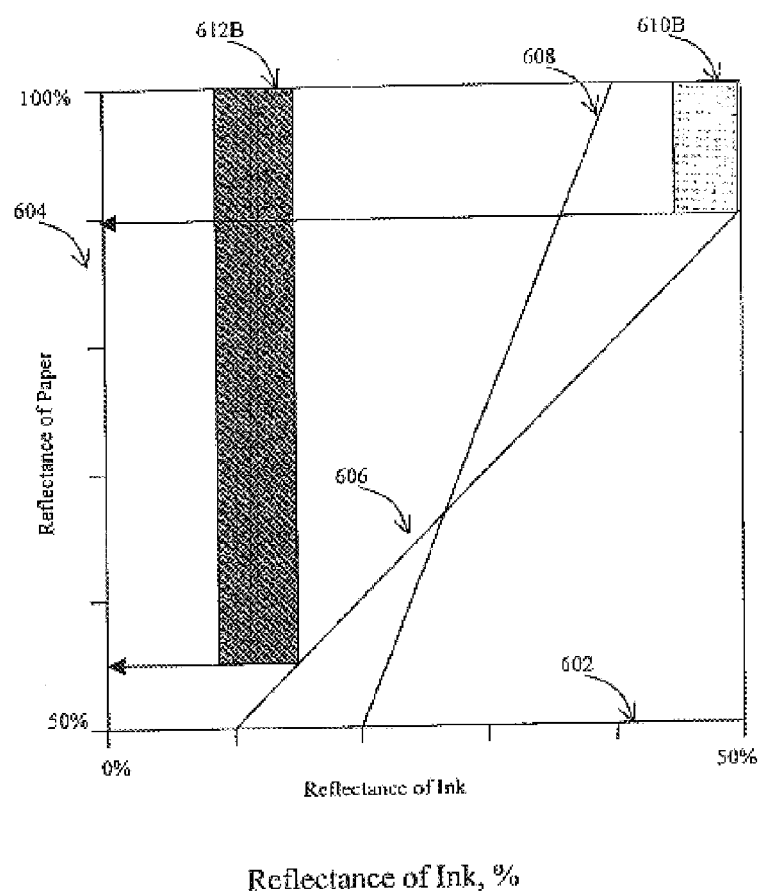

FIGS. 5A and 5B show the range of ink reflectivity that provides readability for red and black inks by superimposing the spectra on the spectral factor of an orthochromic filter and shows the superiority of machine readability for a black ink. FIG. 5A is a graph showing percent reflectance for black and red ink contrast seen with a green filter. This figure shows the region of ink and paper reflectivity which enables machine-readability in a particular case, i.e., to the left of both 608 and 606. Paper reflectivity is on the vertical axis and ink reflectivity is on the horizontal axis. In order to achieve a high read-rate with typical machine-reading systems ink and paper optical reflectance should satisfy two requirements. The difference between the paper reflectance 604 and ink reflectance 602 is the Print Reflectance Difference (PRD). For reliable scanning operation the PRD has to be higher than a minimum value which is typically equal to 0.3 as required by the DMM (USPS Domestic Mail Manual). The acceptable region is thus above and to the left of the line 608. Machine reading systems often automatically adjust the threshold for binarization of the image as a percentage of the substrate reflectance. The ratio of the PRD and the substrate reflectance is the Print Contrast Signal (PCS). For efficient thresholding and decoding, the PCS has to be higher than a minimum value which is typically 0.5 for most decoding algorithms used in automatic identification and data capture systems. Thus the acceptable region must also be above and to the left of the line 606. The example red and black ink reflectance areas, represented by 610A and 612A, respectively, are both within the acceptable range for this filter. For FIG. 5B, on the other hand, is a graph showing percent reflectance for black and red ink contrast seen with a red filter. Here, area 610B, red reflectance, is to the right of line 608—showing poor contrast.

FIGS. 5A and 5B exemplify those conditions where the range of permissible paper reflectance is shown in the shaded area for black inks at 612 and for red inks at 610. With a scanner as defined above, black inks reflectance values range typically from 0.1 to 0.15 or Optical Density (OD) in the range 0.8<OD<1.0, while red inks reflectance values range higher, typically from 0.275 to 0.325 (0.5<OD<0.55. The net result is that a large range of paper reflectance (R.paper>0.55) can be used with black inks, while paper reflectance is limited to (R.paper>0.80) for red inks. In other words red inks restrict the background of the paper to white only, while with black inks, off-white, gray and manila paper are permissible.

Figure 6:
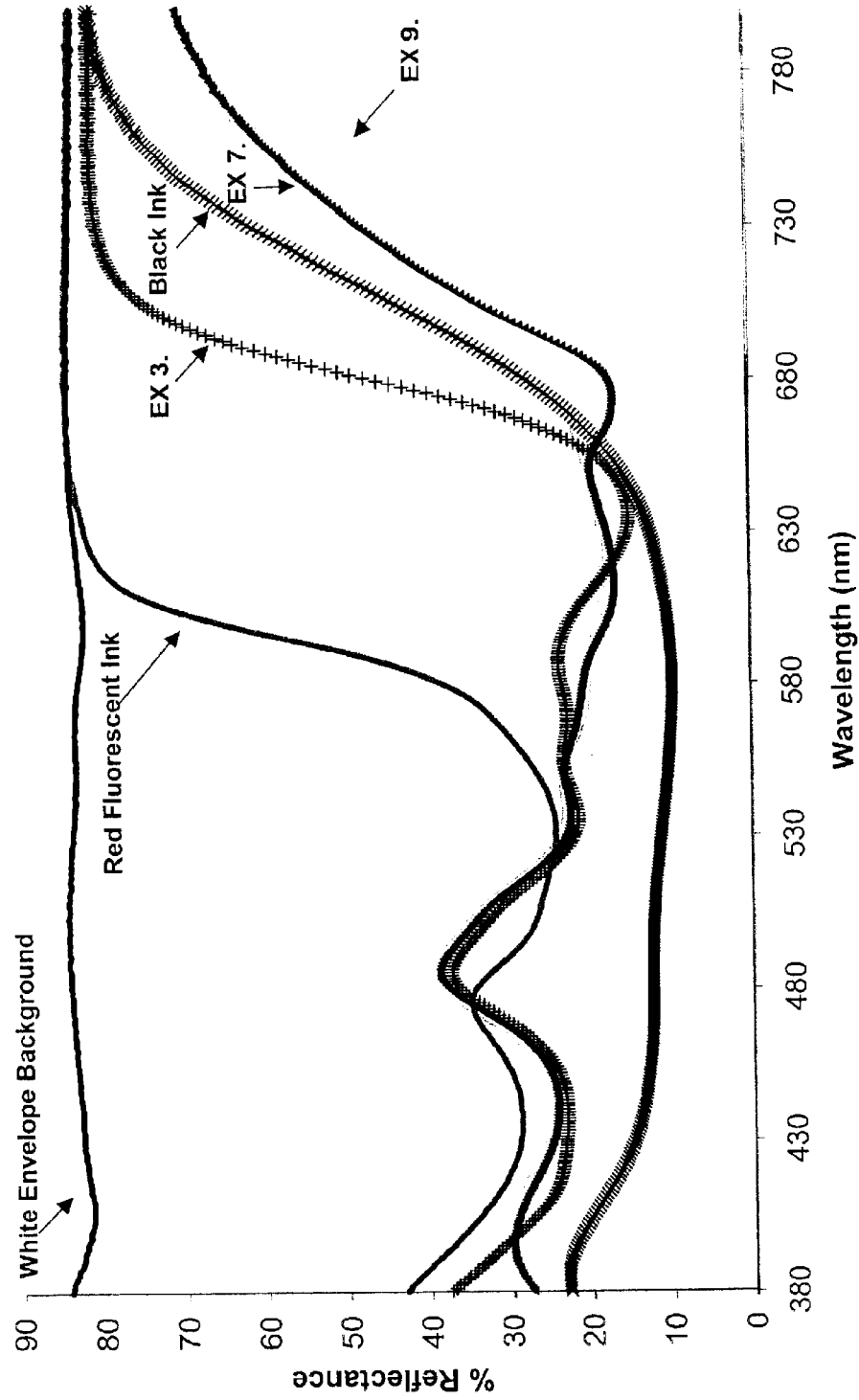
FIG. 6 is a graph presenting a comparison of reflectance spectra of various heterogeneous inks.

FIG. 6 shows a comparison of reflectance spectra of various heterogeneous inks with a white envelope background. FIG. 6 represents percent reflectance versus wavelength of ink jet ink Examples 3, 7, 9, red-fluorescent postage meter ink jet ink and a commercial black ink jet ink produced as drawdowns on white envelope. The instrument used for this graph was Perkin Elmer Lambda 900 Spectrometer.

The inks described herein and illustrated in the examples presented below comprise water-based heterogeneous photosensitive optically variable ink compositions. The inks of the invention should have a visual dark color (neutral black), e.g., with L, a, b values in the range of L=(<57), a=(−5 to 5), b=(−5 to 5) and preferably in the range of L=(,55), a=(−1 to 1), b=(−1 to 1) and a red-fluorescent signal when excited with UV light short or long wavelength. The print contrast signal is preferably greater than 0.5, for white and kraft paper with the red or green filters, when measured with the Envelope Reflectance Meter from the USPS. For white paper, values of greater than 0.60 are obtained, e.g., 0.69 and above with a green filter and 0.71 and above for a red filter. For kraft paper, it is preferably greater than 0.50 for a green filter and 0.55 and above with a red filter.

The PRD is preferably greater than 0.25 for white and kraft paper with the red and green filters. For white paper with a red filter, it can be 0.60 and above and 0.55 and above for a green filter. For kraft paper with a red filter, it can be 0.30 and above and 0.25 and above for a green filter. The optical density of the visible component is therefore high enough to allow automatic scanning using an OCR scanner or the like. The fluorescent component is suitable for use by the facing equipment to orient the mail and, preferably, to discriminate from green phosphorescent stamps. The emissions are in the wavelength range of 580–640 nm when excited by UV light. The fluorescent intensity should be at least 7 PMU, e.g., 15 for postal sorting operations, and for example is in the range of (39–69) Phosphor Meter Unit (PMU) for solid printed areas and 50 to 98 PMU for drawdowns, the fluorescent component can be carried by the solvent (carrier) into the substrate and provide adequate fluorescent signal intensity. The 15 PMU imprint value is dependent upon the intensity of the fluorescent material contained in the ink, type of envelope paper, graphic design of the printing elements such as 2-D bar code, indicia, postage values, date, but he most critical is the total solid area which is captured through the unit's window. The larger the total solid area the greater the PMU value.

In preferred forms, and when viewed from a variety of perspectives, the colorants can be selected such that the net effect between fluorescence and quenching by the other components that when dry: after a draw down on white envelope substrate exhibits a fluorescent intensity of 50 to 99+ PMU; after a postage meter imprint is produced with a resolution of 160×480 dots per inch of a solid area on white envelope substrate exhibits a fluorescent intensity of 39 to 69 PMU; after a high resolution printer produces a solid area with a resolution of 1440×720 dots per inch of a solid area on white envelope substrate exhibits a fluorescent intensity of 19 to 39 PMU; after a high resolution printer produces a solid area with a resolution of 1440×720 dots per inch of a solid area on kraft paper substrate exhibits a fluorescent intensity of 19 to 32 PMU; dry after a high resolution printer produces a solid area with a resolution of 1440×720 dots per inch of a solid area on white envelope substrate exhibits a fluorescence intensity with a Fluoromax-2 Fluorescent Spectrophotometer of 96,482 to 232,643 counts per second; and after a high resolution printer produces a solid area with a resolution of 1440×720 dots per inch on kraft envelope substrate exhibits fluorescent intensity when measured with a Fluoromax-2 Fluorescent Spectrophotometer of 106,576 to 242,180 counts per second.

Figure 7:
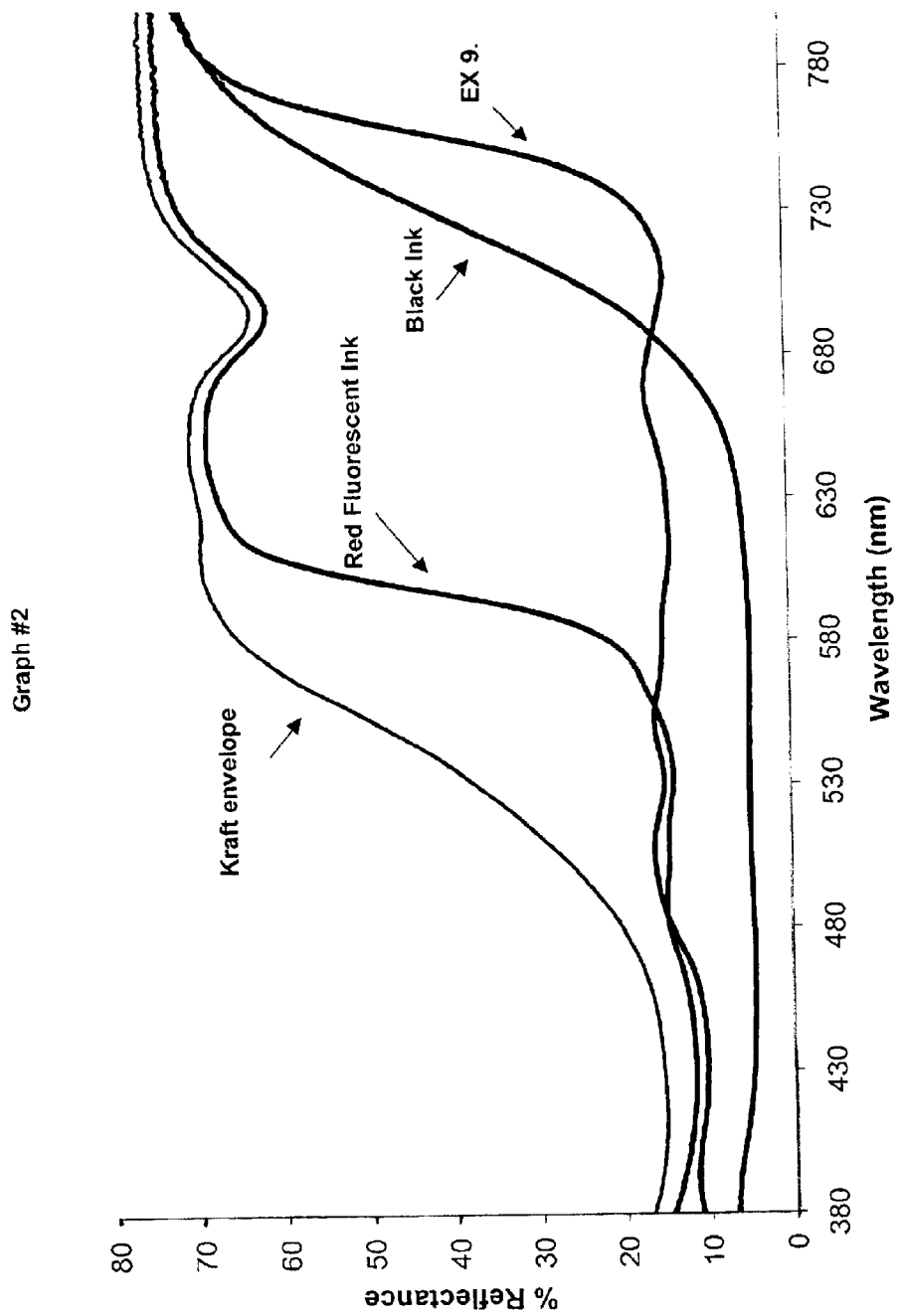
FIG. 7 is a graph presenting a comparison of reflectance spectra of various heterogeneous inks on Kraft envelopes with the reflectance spectra of a Kraft envelope.

FIG. 7 shows a comparison of reflectance spectra of various heterogeneous inks with the reflectance spectra of a Kraft envelope. FIG. 7 shows the reflectance versus wavelength of ink jet ink Example 9, red-fluorescent postage meter ink and commercial black ink jet ink produced as drawdowns on brown kraft envelope.

Figure 8:
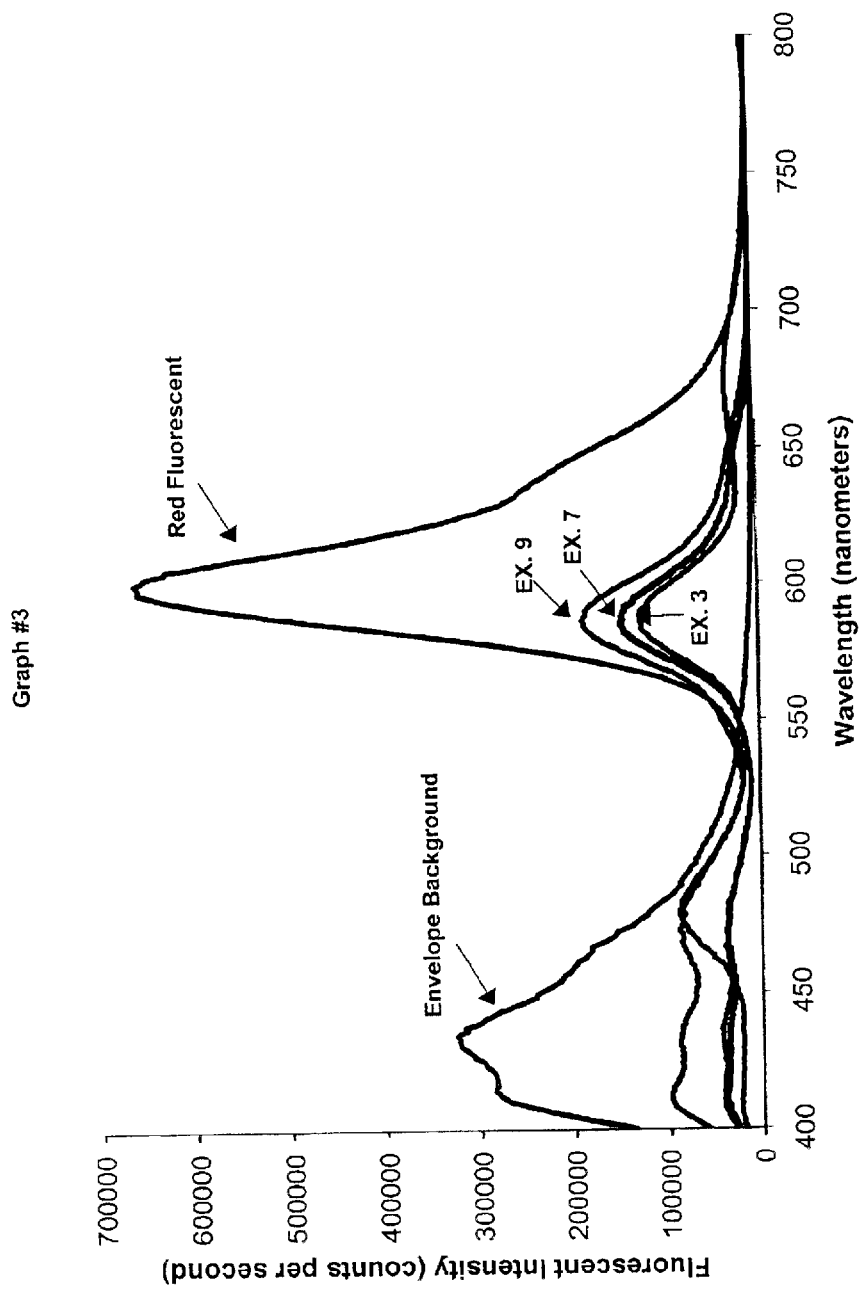
FIG. 8 is a graph presenting a comparison of fluorescent emission spectra of various heterogeneous inks compared to an envelope fluorescence.

FIG. 8 shows a comparison of fluorescent emission spectra of various heterogeneous inks compared to an envelope. FIG. 8 shows the result of drawdowns on Print Master white 24-pound basis weight envelopes purchased from Old Colony/National from MA. This graph plots the fluorescent intensity (counts per second) recorded on the fluorescent Spectrophotometer versus the wavelength after 254 nanometer excitation. Drawdowns of ink jet ink Examples 3, 7, 9 and red-fluorescent ink jet postage meter ink were produced on white envelopes.

FIG. 9A is a table of reflectance and fluorescence characteristics of a drawdown on white paper of example heterogeneous inks compared with a traditional meter ink. FIGS. 9A to 9D represent properties of a red postage meter ink jet ink as a control and all the previously stated ink jet ink examples 1 to 9.

The color was measured using Bispectral Fluorescence Colorimeter (BFC-450) from Labsphere Inc. This calorimeter has the unique advantage of being able to separate the fluorescent and reflected components of the light emitted from the sample thus calculating the true color parameters of the object. Ink drawdowns and printed samples were placed in the sample holder and the reflectance and fluorescence measured from 380 nm to 780 nm. The instrument has 0°/45° reflectance geometry and the results presented are using D65 illumination at a 10° standard observer according to CIE (International Commission on Illumination) standards established in 1964. The instrument measures the color in tristimulus values and the software converts the data to the CIELAB color space. The L value is a measure of light and dark, while the a and b values are a measure of the color. Neutral color would be represented by a=0 and b=0, with the color shifting from gray to black as the L value decreases.

The fluorescence intensity of the drawdown and prints were measured using a USPS supplied LM-2C Luminescence Meter. The LM-2C excites the printed area with a pulsed short UV (254 nm excitation) lamp displays the amount of fluorescence detected in Phosphor Meter Units (PMU). The PMU is directly related to the energy collected by the detectors and a PMU reading of 7 is acceptable for postal operations. The LM-2C is designed with internal red and green filters so that only a red fluorescence is allowed to reach the detectors (560 nm–660 nm) under simultaneous excitation. The PMU meter window is 5.2 cm$^2$. The unit has a portable standard plate containing a 3.2 cm diameter circular red fluorescent wafer for calibration purposes. The plate with the wafer is placed ont the unit with the circular wafer completely encompassing the read window. The wafer has a specific red fluorescent intensity value near the mid range of 61 PMU for this particular serial number meter and a full scale reading of 99 PMU. Each PMU unit has it's own calibration plate but al red fluorescent wafers are in the range of 59 to 65 PMU. The instrument can be manually adjusted to meet the wafer value. The drawdown samples completely cover the window. The solid area measured in the postage meter imprints were 1.9 cm×1.6 cm (3.04 cm$^2$) The DataMatrix in the high resolution prints had a printed area of 1.144 cm$^2$ or a 22% fill of the window. For any samples that read at or greater then 99 the area of the PMU meter window was made smaller until a value different than 99 could be obtained. This value was then extrapolated to the full PMU window scale. Five readings were obtained for each sample and the results averaged.

The fluorescence was measured by using a FluoroMax-2 fluorescence spectrophotometer from Spex. The spectrophotometer is calibrated by using a Xenon lamp scan and a water Raman scan. The peaks of the scans must fall at 467 nm and 397 nm respectively. The instrument was set to an excitation of 254 nm and the slits set to 1 nm bandpass (0.235 mm slit width) for both the emissions and excitation monochrometers. The drawdown or printed sample is then placed in the front face accessory and the sample compartment closed securely so that no stray light can enter the sample chamber. A 365 nm cut-on filter is placed in the emissions beam to prevent diffracted excitation light from obscuring the true spectra. An emissions spectra is then obtained in the visible region from 400–800 nm. The Fluoromax-2 records the results in photon counts per second (cps) for each wavelength.

A U.S.P.S. specified Envelope Reflectance Meter (ERM) was used to measure various optical properties of the ink drawdowns. The ERM was calibrated using black and white reflectance standards supplied with the instrument. A sample is placed in the instrument, moving it to five different spots to obtain an average measure of the envelope background reflectance. The same is followed for the ink drawdown. The instrument measures the reflected light through two different filters, a red filter centered at 610 nm, and a green filter centered at 530 nm. A toggle switch changes the display from one filter to the other. The displayed data contains the reflectance measured and two addition numbers, the print reflectance difference (PRD) and print contrast signal (PCS).

DataMatrix barcode contrast was measured using white light illumination. A black and white Charge Couple Device (CCD) camera was mounted perpendicular to the table and set at a height as to give a optical resolution of 250 dpi. Two white fluorescent lights were set on either side of the table to give balanced lighting. The illumination and camera settings were calibrated with Kodak gray scale cards of 18% reflectance and 90% reflectance. The cards encompassed the whole field of view of the camera. Using the software, a histogram of small random areas of the field of view were examined for a constant gray scale value. The lighting is balanced if all selected areas in the field of view give the same gray scale value. A Personal Post Office meter printed a 36 rows ×36 columns DataMatrix symbol with 18.75 mil element size at 160×480 resolution using the various inks for the postage meter imprints. A 40 rows ×40 columns DataMatrix symbol with a 16.7 mil element size was printed at 1440×720 DPI with an Epson Stylus 760 printer for the high resolution contrast measurements. The symbol properties (contrast included) were then calculated according to Automatic Identification Manufacturing (AIM) specifications using Cimatrix software. A Metanetics hand held verifier (IV-2500) using red light emitting diodes (660 nm LED's) was also used to measure the contrast of the prints.

The information in FIG. 9A were measurements made of controlled drawdowns as described in the procedure section on Print Master White wove, number 10 with a basis weight of 24 pounds per ream.

The FIGS. 9A to 9D represent properties of a commercially available red fluorescent postage meter ink jet ink as a control and the properties of all the ink jet ink examples. The information listed in FIG. 9A is measurements made of KCC101 Coater drawdowns. Table 9B represents the properties of imprints made on a Personal Post Office ink jet postage meter on the same white envelope used in Table 9A. Table 9C contains data of all the inks printed with an Epson Color 760 printer at 1440×720 DPI on the same white wove envelopes used in Table 9A. Table 9D contains similar data as Table 9C with high resolution prints made on Kraft Envelopes instead of the Printmaster White Wove envelopes.

FIG. 9B is a table of reflectance and fluorescence characteristics of meter imprints of example heterogeneous inks compared with a traditional meter ink. FIG. 9B represents the properties of imprints made on a Pitney Bowes Personal Post Office ink jet postage meter on the same white envelope used in FIG. 9A and on Kraft envelopes.

A POV security marking printed with ink jet printing can be obtained at various resolutions depending on the properties of the printer. This capability allows the variation of the optical density and fluorescence in a controlled way. By changing the resolution we can enhance the readability and also include additional security features linked to the varying resolution parameters. Tables showing this variation in optical density and fluorescence for the heterogeneous inks at different resolutions are attached:

O.D. vs. Resolution—Printed with Epson Stylus Color 760
For the formulation of Example 9, below

| Resolution | PMU (small datamatrix) | O.D. (solid area) |
| --- | --- | --- |
| 180 × 180 | 23 | 0.22 |
| 360 × 360 | 42 | 0.51 |
| 720 × 720 | 41 | 0.60 |
| 1440 × 720 | 39 | 0.76 |

FIG. 9C is a table of reflectance and fluorescence characteristics of meter imprints of example heterogeneous inks printed at high resolution on white envelopes compared with a traditional meter ink. FIG. 9D is a table of reflectance and fluorescence characteristics of meter imprints of example heterogeneous inks printed at high resolution on Kraft envelopes compared with a traditional meter ink. FIG. 10 is a table of physical properties of example heterogeneous inks.

The viscosity of the liquid inks were measured using a Haake VT550 Viscotester with a NV rotor and cup sensor system. The NV sensor system consists of a cup and a bell shaped rotor. It is classified as a coaxial cylinder sensor system with two gaps for shearing the samples on the inside and outside of the rotor. The procedure used to measure viscosity is as follows; A temperature control bath attached to the viscometer was set to 25 degrees C. and the test sample allowed to equilibrate in bath temperature for 10 minutes. The viscosity of test ink sample was measured using variable rotor speeds from 50 sec$^{-1}$ to 3500 sec$^{-1}$. This gives a stress-strain relationship from which the viscosity can be calculated by measuring the slope. The viscometer-supplied software provides the viscosity value.

The pH of the liquid samples was measured using an Orion EA 920 pH Meter with a 8135BN flat surface electrode. The pH meter was calibrated with N. I. S. T. (National Institute of Standards and Technology) certified buffer solutions of pH 5, 7, and 10 before any measurements were recorded.

The surface tension of the solutions was measured using the DuNouy method with a Fisher Surface Tensiomat with a platinum iridium ring. The instrument was calibrated by measuring the surface tension of pure water (American Chemical Society reagent grade) which was found to be in the range of 72 dynes/cm±0.5 dynes/cm at the room temperature of 25° C.

The stability/aging was assessed by measuring several different properties over time after placing the ink at an elevated temperature. Characteristics of the ink on paper were examined such as, optical density, fluorescence, and color. The liquid ink was characterized as well for changes in viscosity, and signs of crystallization or separation. The liquid inks were placed into a glass jars, tightly sealed with a cap and put into an oven at 60° C. The samples were removed from the oven after 24 hours and allowed to cool for 1 hour to ambient temperature before evaluation. The samples were tested for seven consecutive days. The observed properties were recorded and plotted versus time and deviations were noted. The inks tested in the present invention were stable with only minor variations in the properties observed. Performance in the printers was tested as well for reliability and prints were taken at variable frequency to confirm that the print quality did not change.

The following examples are presented to further illustrate and explain the invention and should not be use to limit the description or claims. Unless indicated otherwise, all parts and percentages are on a weight-to-weight basis.

All the components of the following examples were added together in a container and mixed with a magnetic stirrer for 30 minutes. The ink was vacuum filtered through a 1 micron borosilicate micro fiberglass filter supplied by USF Filtration to remove any large solids prior to printing.

The Lumikol dispersions described above are available from United Mineral & Chemical Corp. of Lynhurst, N.J., a distributor for Nippon Keiko Kagaku of Japan. ECX dispersions described above are available from Day Glo Color Corp, Cleveland, Ohio. All the Acid and Basic dyes used in the following examples are available from Pylam Products of Tempe, Ariz. The Direct and Reactive dyes (Duasyn) are available from Clariant Corp, of Coventry, R.I. with the exception of Direct Blue 199 and Direct Blue 307 which are available from Avecia under the Pro-Jet Cyan 1 and 2 trade names.

The components of the Examples which follow were combined and mixed using a magnetic stirrer until a uniform ink composition was obtained.

EXAMPLE 1

| COMPONENT | (wt. %) |
|---|---|
| ECX 13EG Red (Ethylene Glycol Base)[1] | 26.700 |
| Basic Yellow 40 (FYD) | 0.220 |
| Acid Blue 9 (BD) | 0.390 |
| Polyvinylpyrrolidone(K-12) (LMWR) | 0.792 |
| Triethylene Glycol Mono-n-butyl Ether (GE) | 2.728 |
| 2-Pyrrolidone (HPS) | 3.960 |
| Polyethylene Glycol (GH) | 9.856 |
| Distilled H2O | 55.354 |
| Total | 100.000 |

[1]The ECX13EG used is a modified version of ECX13 dispersion. The water was removed by vacuum distillation and replaced with ethylene glycol.

EXAMPLE 2

| COMPONENT | (wt. %) |
|---|---|
| Lumikol NKW-3203C Red (37% Pigment) (EPPR) | 32.80 |
| Lumikol NKW-3204C Orange (37% Pigment)(EPPO) | 27.83 |
| Acid Blue 9 (BD) | 0.447 |
| Duasyn Red *3B-SF Liquid (15% Reactive Red 23) (NFRD) | 0.867 |
| Glycerin (GH) | 17.40 |
| Distilled H2O | 20.656 |
| Total | 100.000 |

EXAMPLE 3

| COMPONENT | (wt. %) |
|---|---|
| Lumikol NKW-3203C Red (37% Pigment) (EPPR) | 28.500 |
| Lumikol NKW-3204C Orange (37% Pigment) (EPPO) | 24.200 |
| Acid Blue 9 (BD) | 0.680 |
| Triethylene Glycol Mono-n-butyl Ether (GE) | 7.720 |
| Glycerin (GH) | 8.970 |
| Distilled H2O | 29.930 |
| Total | 100.00 |

EXAMPLE 4

| COMPONENT | (wt. %) |
|---|---|
| Lumikol NKW-3204C Orange (37% Pigment) (EPPO) | 25.000 |
| Lumikol NKW-3203C Red (37% Pigment)(EPPR) | 29.500 |
| Acid Blue 9 (BD) | 0.530 |
| Dimethyl Sulfoxide (HPS) | 1.000 |
| Triethylene Glycol Mono-n-butyl Ether (GE) | 7.720 |
| Glycerin (GH) | 8.970 |
| Distilled H2O | 27.280 |
| Total | 100.000 |

EXAMPLE 5

| COMPONENT | (wt %) |
|---|---|
| Lumikol NKW-3204C Orange (37% Pigment) (EPPO) | 23.800 |
| Lumikol NKW-3203C Red (37% Pigment) (EPPR) | 28.700 |
| Duasyn Blue FRL-SF Liquid (10% DB 199) (BD) | 5.700 |
| Triethylene Glycol Mono-n-butyl Ether (GE) | 4.700 |
| Glycerin (GH) | 8.800 |
| Distilled H2O | 28.300 |
| Total | 100.000 |

EXAMPLE 6

| COMPONENT | (wt %) |
|---|---|
| Lumikol NKW-3204C Orange (37% Pigment) (EPPO) | 23.800 |
| Lumikol NKW-3203C Red (37% Pigment) (EPPR) | 28.700 |
| Projet Fast Cyan 2 (6% Direct Blue 307) (BD) | 12.50 |
| Triethylene Glycol Mono-n-butyl Ether (GE) | 4.700 |
| Glycerin (GH) | 8.800 |
| Distilled H2O | 21.500 |
| Total | 100.00 |

EXAMPLE 7

| COMPONENT | (wt %) |
|---|---|
| Lumikol NKW-3203C Red (37% Pigment) (EPPR) | 23.300 |
| Lumikol NKW-3204C Orange (37% Pigment) (EPPO) | 27.200 |
| Duasyn Blue FRL-SF Liquid (10% DB199) (BD) | 5.800 |
| Triethylene Glycol Mono-n-butyl Ether (GE) | 4.900 |
| Nuosperse 2000 (SH) | 9.700 |
| Distilled H2O | 29.100 |
| Total | 100.00 |

EXAMPLE 8

| COMPONENT | (wt %) |
|---|---|
| ECX-15 Orange (45% Pigment) (EPPO) | 22.700 |
| ECX-13 Red (45% Pigment) (EPPR) | 27.300 |
| Duasyn Blue FRL-SF Liquid (10% DB 199) (BD) | 6.000 |
| Triethylene Glycol Mono-n-butyl Ether (GE) | 3.640 |
| Nuosperse 2000 (Condea Servo) (SH) | 10.000 |
| Distilled H2O | 30.360 |
| Total | 100.00 |

EXAMPLE 9

| COMPONENT | (wt %) |
|---|---|
| Lumikol NKW-3204C Orange (37% Pigment) (EPPO) | 23.800 |
| Lumikol NKW-3203C Red (37% Pigment) (EPPR) | 28.700 |
| Acryjet Cyan-157 (20% Pigment Blue 15:3) (BP) | 5.500 |
| Triethylene Glycol Mono-n-butyl Ether (GE) | 4.750 |

-continued

EXAMPLE 9

| COMPONENT | (wt. %) |
|---|---|
| Glycerin (GH) | 8.800 |
| Distilled H2O | 28.450 |
| Total | 100.000 |

EXAMPLE 10

| COMPONENT | (wt. %) |
|---|---|
| Lumikol NKW-3204C Orange (37% Pigment)(EPPO) | 27.800 |
| Lumikol NKW-3203C Red (37% Pigment) (EPPR) | 28.700 |
| Hostafine Blue B2G (40% Pigment Blue 15:3) (BP) | 2.000 |
| Triethylene Glycol Mono-n-butyl Ether (GE) | 4.700 |
| Glycerin (GH) | 4.400 |
| Ethlyene Glycol (GH) | 4.400 |
| Distilled H2O | 28.000 |
| Total | 100.000 |

Evaluation of Example Inks and Paper Interaction Properties:

The inks of the present invention were evaluated for liquid properties such as viscosity, surface tension, and pH. See FIG. 10. Physical properties such as reflectance at various wavelengths and fluorescence were also examined initially for ink drawdowns and also printed samples with digital postage meters and commercial ink jet printers. The data was obtained utilizing the procedures which follows and is presented in Tables set out in FIGS. 9A through 9D.

Drawdown Preparation:

The equipment required included the following; a wire wound rod #1 (Yellow Handle—0.08 mm wire diameter), KCC101 Coater or similar drawdown apparatus, Printmaster No.10 White Wove envelopes supplied by Old Colony or equivalent, Pasteur pipettes or eyedroppers and Cellophane Tape. A drawdown of the ink sample was prepared by cutting several envelopes into 2×11 inch strips then securing the paper samples on KCC101 units surface. A setting bar was then used as described in KCC101 manual to create even pressure across the KCC101 surface. The yellow handled wire wound bar #1 was then placed in the unit. A 1.5" long piece of cellophane tape was placed across the paper strip below and parallel to wire wound rod. The test ink sample is then distributed evenly across cellophane tape. The speed of the KCC101 was then set to setting #10 (12 m/min) and the drawdown motor switch moved to the forward position. The drawdown samples are removed and allowed to dry for 24 hours before taking measurements.

Evaluation 1: Optical Density

The optical density of the drawdowns and prints were measured by using a X-Rite densitometer with an orthochromatic filter. Several strips of the white wove envelope were used under the drawdown to insure that the background is consistent and does not affect the measurements. Five different areas were sampled and the results averaged.

Evaluation 2: Color

The color was measured using Bispectral Fluorescence Colorimeter (BFC-450) from Labsphere Inc. This calorimeter has an advantage of the ability to separate the fluorescent and reflected components of the light emitted from the sample thus calculating the true color parameters of the fluorescent object. The instruments unique dual monochromator design measures the reflectance and fluorescence every 10 nm. The resulting bispectral matrix is then used to calculate the sample's total radiance factor providing a complete and illuminant independent colorimetric characterization of a sample. Ink drawdowns and printed samples were placed in the sample holder and the reflectance and fluorescence measured from 380 nm to 780 nm. The instrument has 45°/0° reflectance geometry and the results presented are using D65 illumination at a 10° standard observer according to CIE (International Commission on Illumination) standards established in 1964. The L value is a measure of light and dark, while the a and b values are a measure of the color. Neutral color would be represented by a=0 and b=0, with the color shifting from gray to black as the L value decreases.

Evaluation 3: Fluorescence(PMU)

The fluorescence intensity of the drawdowns and prints were measured using a U.S.P.S. supplied LM-2C Luminescence Meter. The LM-2C measures fluorescence as a result of excitation with a pulsed short wavelength ultraviolet lamp (254 nm). The relative strength of the emission is displayed in Phosphor Meter Units (PMU). The PMU displayed is proportional to the energy collected by the detectors through a 5.2 cm$^2$ aperture window, a PMU reading of 7 is considered acceptable for postal sorting operations. The LM-2C is designed with internal filters so that only specific emission wavelengths are allowed to reach the detectors (560 nm–660 nm). The ink drawdown samples examined completely covered the aperture window, while the solid area measured in the postage meter imprints were 1.9 cm×1.6 cm (3.04 cm$^2$) or 58.5% of the total window area. The datamatrix in the high-resolution prints had a printed area of 1.144 cm$^2$ or a 22% fill of the window. The PMU meter has a maximum reading of 99 PMU. For any samples that read greater then 99 the area of the PMU meter window was made smaller until a value could be obtained. This value was then linearly extrapolated to the full PMU window scale. Five readings were obtained for each sample and the results averaged.

Evaluation 4: Fluorescence (Spectrophotometer)

Alternately, the fluorescence was measured by using a fluorescence spectrophotometer such as the FluoroMax-2 from Spex. The spectrophotometer is calibrated by using a Xenon lamp scan and a water Raman scan. The Xenon lamp scan shows the spectral radiance of the excitation source through the excitation monochromator. The Xenon lamp has a distinct spectral output, with a maxima at 467 nm. The excitation monochromator is adjusted with the instrument supplied software to display the correct maxima. The emission monochromator is calibrated by measuring the Raman peak of water. Due to O-H stretching, a water sample when excited at 350 nm, will exhibit a peak at 397 nm. The emission monochomator is adjusted using the instrument supplied software so that the peak maxima is 397 nm. The fluorescent intensity is calibrated by using a red fluorescent standard supplied by Matech (Westlake Village, Calif.). This standard is made from europium doped microspheres, it is extremely stable and has a very characteristic fluorescent emission. Prior to measurements, the standard is checked for a sharp peak at 610 nm with an intensity of 270,000 cps. The instrument was set to an excitation of 254 nm and the slits set to 1 nm bandpass (0.235 mm slit width) for both the emissions and excitation monochromators. The drawdown or printed sample is then placed in the front face accessory and the sample compartment closed securely so that no stray light can enter the sample chamber. A 365 nm cut-on filter is placed in the emissions beam to prevent any 2$^{nd}$ order diffracted excitation light from obscuring the true spectra. An emissions spectra is then obtained in the visible region from 400–800 nm. The Fluoromax-2 records the results in photon counts per second (cps) for each wavelength.

Evaluation 5: Print Reflectance Difference(PRD)/Print Contrast Ratio(PCR)

A U.S.P.S. specified Envelope Reflectance Meter (ERM) was used to measure various optical properties of the ink drawdowns. The ERM was calibrated using black and white reflectance standards supplied with the instrument. A sample is placed in the instrument, moving it to five different spots to obtain an average measure of the envelope background reflectance. The same is followed for the ink drawdown. The instrument measures the reflected light through two different filters, a red filter centered at 610 nm, and a green filter centered at 530 nm. A toggle switch changes the display from one filter to the other. The displayed data contains the reflectance measured and two addition numbers, the print reflectance difference (PRD) and print contrast ratio (PCR). The PRD is the reflectance of the background minus the reflectance of the ink. The PCR is the PRD divided by the envelope background to give a contrast ratio.

Evaluation 6: Bar Code Contrast

A method to determine Datamatrix barcode contrast was measured as follows using white light illumination. A black and white Charge Couple Device (CCD) camera was mounted perpendicular to the table and set at a height as to give a optical resolution of 250 dpi. Two white fluorescent lights were set on either side of the table to give balanced lighting. Using Kodak gray scale cards of 18% reflectance and 90% reflectance the illumination and camera settings were calibrated. The cards encompassed the whole field of view of the camera. Using the software, a histogram of small random areas of the field of view were examined for a constant gray scale value. The lighting is balanced if all selected areas in the field of view give the same gray scale value. A 36 rows ×36 columns datamatrix symbol with 18.75 mil element size was printed with the Personal Post Office meter at 160×480 resolution using the various inks for the postage meter imprints. A 40 rows ×40 columns datamatrix symbol with a 16.7 mil element size was printed at 1440× 720 DPI with an Epson Stylus 760 printer for the high resolution contrast measurements. The symbol properties (contrast included) were then calculated according to Automatic Identification Manufacturing (AIM) specifications using Cimatrix software. A Metanetics hand held verifier (IV-2500) using red light emitting diodes (660 nm LED's) was also used to measure the contrast of the prints. Both the IV-2500 and the Cimatrix software obtain a grayscale image of the barcode and calculates the mean reflectance of the darkest 10% of the pixels and the mean reflectance of the lightest 10% of the pixels. The difference of the two means is defined as the symbol contrast.

Evaluation 7: Viscosity

The viscosity of the liquid inks were measured using a Haake VT550 Viscotester with a NV rotor and cup sensor system. The NV sensor system consists of a cup and a bell shaped rotor. It is classified as a coaxial cylinder sensor system with two gaps for sheering the samples on the inside and outside of the rotor. The procedure used to measure viscosity is as follows; A temperature control bath attached to the viscometer was set to 25 degrees C. and the test sample allowed to equilibrate in bath temperature for 10 minutes. The viscosity of test ink sample was measured using variable rotor speeds from 50 sec.$^{-1}$ to 3500 sec.$^{-1}$. This gives a stress-strain relationship from which the viscosity can be calculated by measuring the slope. The viscometer-supplied software provides the viscosity value.

Evaluation 8: pH

The pH of the liquid samples was measured using an Orion EA 920 pH Meter with a 8135BN flat surface electrode. The pH meter was calibrated with N. I. S. T. (National Institute of Standards and Technology) certified buffer solutions of pH 5, 7, and 10 before any measurements were recorded.

Evaluation 9: Surface Tension

The surface tension of the solutions was measured using the DuNouy method with a Fisher Surface Tensiomat with a platinum iridium ring. The instrument was calibrated by measuring the surface tension of pure water (American Chemical Society reagent grade) which was found to be in the range of 72 dynes/cm±0.5 dynes/cm at the room temperature of 25° C.

Evaluation 10: Aging/Stability

The stability/aging was assessed by measuring several different properties over time after placing the ink at an elevated temperature. Characteristics of the ink on paper were examined such as, optical density, fluorescence, and color. The liquid ink was observed as well for changes in viscosity, and signs of recrystallization or separation. The liquid inks were placed into a glass jars, tightly sealed with a cap and put into an oven at 60° C. The samples were removed from the oven after 24 hours and allowed to cool for 1 to ambient temperature before evaluation. The samples were tested for seven consecutive days. The observed properties were recorded and plotted versus time and any deviations from a straight line were noted. All the inks tested in the present invention were stable with only minor variations in the properties observed.

Evaluation 11: Reliability

The inks were installed in new Epson Stylus Color 760 printers and new Pitney Bowes Personal Post Office meters. After installing the inks a nozzle check pattern and 25 test prints were generated. The ink passed initial reliability if there were no nozzles out, as represented by missing lines in the test print. Over a two week time period. daily test prints were generated. If any nozzles failed to print, a print maintenance cycle on the printer was initiated and a test print generated to determine if the nozzles were completely blocked and unrecoverable. The ink would fail reliability testing if there were more than 3 unrecoverable nozzles. All the inks of the present invention were reliable over the two-week testing period.

The Tables set out in FIGS. 9A through 9D represent properties of a commercially available red fluorescent postage meter ink jet ink as a control and the properties of all the previously stated ink jet ink examples 1 to 10. The information listed in FIG. 9A summarizes measurements made of KCC101 Coater drawdowns as described in the procedure section. FIG. 9B summarizes the properties of imprints made on a Personal Post Office ink jet postage meter on the same white envelope also used in FIG. 9A. FIG. 9C contains data of all the inks printed with an Epson Color 760 printer at 1440×720 DPI on the same white wove envelopes used in FIG. 9A. FIG. 9D contains similar data as FIG. 9C except the high resolution prints were made on Kraft Envelopes instead of the Printmaster White Wove envelopes.

The following table presents a glossary of various terms used in the above description for purposes of convenience and definition.

| Term | Definition |
|---|---|
| Black | Absorbs the entire visible spectrum. |
| SROI | Scanning region of interest. This value depends on the task at hand and is predetermined for that task. For machine-readable images using a blue filter, the range is typically 440–600 nm, and for a red filter, typically 570–700 nm. For visual examination, the complete visual spectrum of from about 390–680 nm is of importance. |
| EPP | Emulsion polymerization process. |
| ERM | Envelope Reflectance Meter |
| FIM | Facing identifying mark is an orientation mark, usually printed near the edge of an envelope. |
| Fluorescence-exciting radiation | As used herein, the term "fluorescence-exciting radiation" refers to radiation of any wave length effective to cause a fluorescent material to fluoresce, and in the preferred cases is in the ultraviolet (UV) region of the spectrum, e.g., below about 390 nm. The source of ultraviolet light may be in the form of incoherent light or from a coherent source such as a laser. The fluorescent-exciting radiation can in addition to UV radiation be X-rays, electron beams, etc., as well as visible electromagnetic radiation of relatively short wavelength, such as green or blue light. |
| GE | Glycol ethers. |
| GH | Glycol humectants. |
| HPS | Highly polar solvents. |
| IBIP | Information-based indicia program. |
| Imagewise | In a defined pattern forming a predetermined image. |
| LMWP | Low molecular weight polymer. |
| NFRD | Non-fluorescent red dye. |
| NFYD | Non-fluorescent yellow dye. |
| OCR | Optical character recognition. |
| OD | Optical density. |
| OVD | Optically variable device. |
| PCS | Print Contrast Signal. The ratio between PRD and the background reflectance is called print contrast ratio (PCR) or print contrast signal (PCS). The PCS is a measure of the print quality and of the capability of the imaging software to detect and overcome print defects. A PCS of at least 80 percent in the SROI is needed while visually read inks require a PCS of 60 percent or higher. |
| PMU | Phosphor meter unit. |
| POV | Photosensitive optically variable. |
| PRD | Print Reflectance Difference. A scanner responds to a difference between light reflected from the printed indicia and the background. This difference is defined as print reflectance difference (PRD). A PRD of at least 40 percent in the SROI is necessary for reading indicia, while visually read inks require only a PRD of about 30 percent. |
| Red Fluorescent | Exhibits fluorescence in the red region of the spectrum, i.e., from 580 to 630 nm. |
| UV | Ultra violet radiation, e.g., about 390 nm and less. |

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A heterogeneous aqueous ink capable of producing dark, machine-readable markings exhibiting fluorescence when exposed to fluorescent-exciting radiation, said ink being of suitable viscosity and surface tension for use in ink jet printing, comprising:
  a. a first colorant comprising a fluorescent dye embedded in a polymeric matrix, said fluorescent dye emitting light within a characteristic emission band when excited by fluorescent-exciting radiation;
  b. a second colorant comprising at least one of a dye and a pigment having a light absorption band at longer wavelengths than the characteristic emission band of the first colorant; and
  c. an aqueous liquid vehicle comprising water and a water-soluble vehicle in sufficient amounts to achieve an ink viscosity and surface tension effective for application of the ink to a substrate in a predetermined pattern by ink jet printing; wherein, the colorants are present in combination in the aqueous ink in amounts effective to cause the ink, when dry, to exhibit a dark color due to the net absorption spectra of the colorants in the visual range and machine-readable or visually-discernable fluorescence when subjected to fluorescent-exciting radiation.

2. An ink according to claim 1 wherein the colorants are selected such that the net effect between fluorescence and quenching by the other components of the ink when dry provides a phosphor meter reading of at least 7 PMU.

3. An ink according to claim 1 wherein the colorants are selected such that the ink when dry will exhibit a print reflectance in red and green light of less than 25%.

4. An ink according to claim 1 wherein the colorants are selected such that the ink when dry will exhibit a blackness) which on the CIE scale shows L values of less than <57, a values of from −5 to 5 and b values of from −5 to 5.

5. An ink according to claim 1 wherein, within the spectral range of interest of from 400 to 680 nm, the ink reflectance is less than 50% of the paper reflectance.

6. An ink according to claim 1 wherein the second colorant comprises a water-soluble dye.

7. An ink according to claim 1 wherein the first colorant comprises red-fluorescent.

8. An ink according to claim 1 wherein the viscosity is less than 15 centipoise.

9. An ink according to claim 8 suitable for thermal ink jet printing wherein the viscosity is form 1 to 5 centipoise.

10. An ink according to claim 8 suitable for piezoelectric ink jet printing wherein the viscosity is form 1 to 12 centipoise.

11. An ink according to claim 10 suitable for piezoelectric ink jet printing wherein the surface tension is within the range of from 20 to 80 dyne/cm.

12. An ink according to claim 10 suitable for thermal ink jet printing wherein the surface tension is within the range of from 30 to 50 dyne/cm.

13. An ink according to claim 1 wherein the second colorant comprises a dye.

14. An ink according to claim 9 wherein the second colorant comprises a dye immobilized within a particulate solid.

15. An ink according to claim 1 wherein the second colorant comprises a pigment.

16. An ink according to claim 1 wherein the second colorant comprises a pigment and a dye.

17. An ink according to claim 1 wherein the polymeric matrix comprises emulsion polymer.

18. An ink according to claim 1 wherein the colorants are selected such that the net effect between fluorescence and quenching by the other components that when dry after a draw down on white envelope substrate exhibits a fluorescent intensity of 50 to 99+PMU.

19. An ink according to claim 1 wherein the colorants are selected such that the net effect between fluorescence and quenching by the other components that when dry after a postage meter imprint is produced with a resolution of 160×480 dots per inch of a solid area on white envelope substrate exhibits a fluorescent intensity of 39 to 69 PMU.

20. An ink according to claim 1 wherein the colorants are selected such that the net effect between fluorescence and quenching by the other components that when dry after a high resolution printer produces a solid area with a resolution of 1440×720 dots per inch of a solid area on white envelope substrate exhibits a fluorescent intensity of 19 to 39 PMU.

21. An ink according to claim 1 wherein the colorants are selected such that the net effect between fluorescence and quenching by the other components that when dry after a high resolution printer produces a solid area with a resolution of 1440×720 dots per inch of a solid area on kraft paper substrate exhibits a fluorescent intensity of 19 to 32 PMU.

22. An ink according to claim 1 wherein the colorants are selected such that the net effect between fluorescence and quenching by the other components that when dry after a high resolution printer produces a solid area with a resolution of 1440×720 dots per inch of a solid area on white envelope substrate exhibits a fluorescence intensity by Fluoromax-2 Fluorescent Spectrophotometer of 96,482 to 232,643 counts per second.

23. An ink according to claim 1 wherein the colorants are selected such that the net effect between fluorescence and quenching by the other components when dry after a high resolution printer produces a solid area with a resolution of 1440×720 dots per inch on kraft envelope substrate exhibits fluorescence intensity when measured with a Fluoromax-2 Fluorescent Spectrophotometer of 106,576 to 242,180 counts per second.

24. A process for preparing an ink described in claim 1, the process comprising:
  admixing the first and second colorants, in combination in amounts effective to cause the ink, when dry, to exhibit a dark color due to the net absorption spectra of the colorants in the visual range and machine-readable fluorescence when subjected to fluorescent-exciting radiation, with the aqueous liquid vehicle in sufficient amounts to achieve an ink viscosity of less than 15 centipoise and surface tension effective for application of the ink to a substrate in a predetermined pattern by ink jet printing the colorants are present.

25. A printing process comprising: applying an ink as described in claim 1 to a substrate by ink jet printing.

26. A substrate bearing an image printed with the ink of claim 1.

27. An ink according to claim 1 wherein the colorants are selected such that the net effect between fluorescence and quenching by the other components that, when dry after drawdown on a white envelope substrate, the image exhibits a fluorescent intensity of 50 to 99+PMU.

28. An ink according to claim 1 wherein the colorants are selected such that the net effect between fluorescence and quenching by the other components that, when dry after a postage meter imprint, the image produced has a resolution of 160×480 dots per inch of a solid area on a white envelope and a fluorescent intensity of 39 to 69 PMU.

29. An ink according to claim 1 wherein the colorants are selected such that the net effect between fluorescence and quenching by the other components that, when dry after a high resolution printer produces a solid area with a resolution of 1440×720 dots per inch on a white envelope substrate, the image exhibits fluorescent intensity of 19 to 39 PMU.

30. An ink according to claim 1 wherein the colorants are selected such that the net effect between fluorescence and quenching by the other components that, when dry after a high resolution printer produces a solid area with a resolution of 1440×720 dots per inch on a kraft envelope substrate, the image exhibits fluorescent intensity of 19 to 32 PMU.

31. An ink according to claim 1 wherein the colorants are selected such that the net effect between fluorescence and quenching by the other components that, when dry after a high resolution printer produces a solid area with a resolution of 1440×720 dots per inch on a white envelope substrate, the image exhibits fluorescent intensity when measured with a Fluoromax-2 Fluorescent Spectrophotometer of 106,575 to 242,180 counts per second.

32. An ink according to claim 1 wherein the colorants are selected such that the net effect between fluorescence and quenching by the other components that, when dry after a high resolution printer produces a solid area with a resolution of 1440×720 dots per inch on a kraft envelope substrate, the image exhibits fluorescent intensity when measured with a Fluoromax-2 Fluorescent Spectrophotometer of 106,575 to 242,180 counts per second.

* * * * *